US010715620B2

(12) United States Patent
Lebsack et al.

(10) Patent No.: US 10,715,620 B2
(45) Date of Patent: Jul. 14, 2020

(54) STREAMING NETWORK MONITORING CACHING INFRASTRUCTURE

(71) Applicant: Google LLC, Mountain View, CA (US)

(72) Inventors: Carl Lebsack, Felton, CA (US); Robert Shakir, San Francisco, CA (US); Paul Borman, Inver Grove Heights, MN (US); Marcus Hines, Mountain View, CA (US); Anees Shaikh, San Jose, CA (US); Joshua George, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 128 days.

(21) Appl. No.: 15/807,045

(22) Filed: Nov. 8, 2017

(65) Prior Publication Data
US 2019/0141157 A1 May 9, 2019

(51) Int. Cl.
H04L 29/08 (2006.01)
G06F 12/0813 (2016.01)
H04L 12/861 (2013.01)
H04L 12/24 (2006.01)
H04L 12/26 (2006.01)

(52) U.S. Cl.
CPC ...... *H04L 67/2842* (2013.01); *G06F 12/0813* (2013.01); *H04L 41/14* (2013.01); *H04L 43/02* (2013.01); *H04L 49/90* (2013.01); *G06F 2212/154* (2013.01); *G06F 2212/60* (2013.01); *G06F 2212/62* (2013.01)

(58) Field of Classification Search
CPC ..... H04L 67/2842; H04L 41/14; H04L 49/90; G06F 12/0813; G06F 2212/154; G06F 2212/60; G06F 2212/62

USPC .......................................... 709/224
See application file for complete search history.

(56) References Cited

U.S. PATENT DOCUMENTS 7,756,831 B1 * 7/2010 Rao .................. G06F 11/1471
   707/638
8,335,821 B2 * 12/2012 Bocirnea .................. H04Q 9/00
   709/203
9,229,869 B1 * 1/2016 Parakh .................. G06F 12/084
(Continued)

OTHER PUBLICATIONS

International Search Report and Written Opinion dated Dec. 11, 2018 in International (PCT) Application No. PCT/US2018/052683.
(Continued)

*Primary Examiner* — Vivek Srivastava
*Assistant Examiner* — Binod J Kunwar
(74) *Attorney, Agent, or Firm* — Lerner, David, Littenberg, Krumholz & Mentlik, LLP

(57) ABSTRACT

Systems and methods of network telemetry caching and distribution are provided. The system can receive network telemetry data and store it as a plurality of data nodes. The system can maintain a node pointer map and a node pointer queue. If the system receives an update to a data node having a corresponding node pointer not already present in the node pointer map, the system can add the node pointer to the node pointer queue and to the node pointer map with a count of zero. If the node pointer is already present in the node pointer map, the system can increment the node count for the node pointer in the node pointer map and not add the node pointer to the node pointer queue. The system can transmit data values and node counts to the client device for each node pointer in the node pointer queue.

24 Claims, 16 Drawing Sheets

(56) References Cited

U.S. PATENT DOCUMENTS

| | | | |
|---|---|---|---|
| 9,244,614 B2 | 1/2016 | Konovalov et al. | |
| 2004/0260833 A1* | 12/2004 | Rachlin | H04L 41/12 709/238 |
| 2008/0195369 A1 | 8/2008 | Duyanovich et al. | |
| 2010/0082664 A1* | 4/2010 | Odaira | G06F 16/2246 707/769 |
| 2010/0241722 A1* | 9/2010 | Seminaro | H04L 67/025 709/207 |
| 2010/0292959 A1* | 11/2010 | Gross | G06F 11/141 702/181 |
| 2010/0321204 A1* | 12/2010 | Bae | H04Q 9/00 340/870.01 |
| 2011/0231546 A1* | 9/2011 | Nathanson | G07C 5/008 709/224 |
| 2013/0091267 A1* | 4/2013 | Urban | H04L 12/2801 709/224 |
| 2013/0191436 A1 | 7/2013 | Chintalapati et al. | |
| 2014/0038511 A1* | 2/2014 | Hall | H04W 4/029 455/3.01 |
| 2014/0266769 A1* | 9/2014 | Van Zelm | E21B 47/12 340/854.3 |
| 2016/0020964 A1* | 1/2016 | Eggleston | H04L 41/5009 709/224 |
| 2016/0034507 A1* | 2/2016 | Aron | G06F 16/16 707/722 |
| 2016/0204992 A1* | 7/2016 | Wu | H04L 41/14 709/224 |
| 2016/0231798 A1* | 8/2016 | Gendler | G06F 1/3203 |
| 2016/0321352 A1* | 11/2016 | Patel | G06F 16/1734 |
| 2017/0090987 A1* | 3/2017 | Hearn | G06F 9/4881 |
| 2017/0177046 A1* | 6/2017 | Garg | G06F 1/26 |
| 2017/0353367 A1* | 12/2017 | Slaight | H04L 43/04 |
| 2018/0210927 A1* | 7/2018 | Karam | G06F 9/3855 |
| 2018/0278629 A1* | 9/2018 | McGrew | H04L 63/1408 |
| 2018/0288503 A1* | 10/2018 | Chayat | H04Q 9/02 |

OTHER PUBLICATIONS

Christensen, Ken, et al. "IEEE 802.3az: The Road to Energy Efficient Ethernet" Energy Efficiency in Communications, IEEE Communications Magazine, vol. 48, No. 11, pp. 50-56, Nov. 2010.

Mostowfi, Mehrgan. "Packet Coalescing and Server Substitution for Energy-Proportional Operation of Network Links and Data Servers" University of South Florida, Graduate Theses and Dissertations, 2013. Retrieved from URL: http://scholarcommons.usf.edu/etd/4732.

* cited by examiner

STREAMING NETWORK MONITORING CACHING INFRASTRUCTURE

BACKGROUND

Efficient and effective control of modern computer networks can benefit from accurate and timely information regarding network conditions. Generally speaking, information regarding network conditions, including the status of individual network devices can be referred to as "network telemetry" data. Network telemetry data can originate at the network devices (e.g., routers and switches) and be made available to network telemetry gathering tools as well as to individual clients. In some cases, frequent polling of a network device by multiple clients may contribute to overloading the device or otherwise impacting its performance for critical functions. Furthermore, the various network devices have been manufactured by different vendors, and may even represent a mix of current and legacy devices, or different device models, each using a different schema for communicating network telemetry data.

SUMMARY

At least one aspect is directed to a network telemetry caching and distribution system. The system includes one or more processors connected to a physical memory and configured to receive, from a network device, a set of network telemetry data. The system is configured to store, in a first memory space of the physical memory, the set of network telemetry data as a plurality of data nodes. The system is configured to maintain, in a second memory space of the physical memory, a client queue having a node pointer queue and a node pointer map. The node pointer map includes a plurality of node-pointer, node-count pairs. Each node pointer indicates a path to a data node corresponding to the node pointer, and the node count indicates a number of updates to the data node since a previous transmission of the contents of the data node to a client device. The system is configured to receive, from the network device, a data node update. If the data node update corresponds to a data node having a corresponding node pointer not already present in the node pointer map, the system is configured to add the corresponding node pointer to the node pointer map with a count of zero and add the corresponding node pointer to the node pointer queue. If the data node update corresponds to a data node having a corresponding node pointer already present in the node pointer map, the system is configured to increment the node count for the corresponding node pointer in the node pointer map and not add the corresponding node pointer to the node pointer queue. The system is configured to transmit, to the client device, a set of node-value, node-count pairs including, for each node pointer in the node pointer queue, a data value in the data node corresponding to the node pointer, and the node count in the node pointer map corresponding to the node pointer.

In some implementations, the node pointer queue can be a first-in-first-out (FIFO) queue that receives node pointers at its input, and provides the node pointers at its output in the order in which they were received.

In some implementations, the system can be configured to transmit the set of node-value, node-count pairs in response to a query received from the client device.

In some implementations, the system can be configured to transmit, to the client device in response to receipt of a request received from the client device subsequent to the query, a second set of node-value, node-count pairs reflecting updates received to data nodes occurring since the transmission of the set of the node-value, node-count pairs.

In some implementations, the system can be configured to continually transmit, following transmission of the first set of node-value, node-count pairs, a second set of node-value, node-count pairs reflecting updates received to data nodes as they occur.

In some implementations, the system can be configured to respond to a query that includes a subpath representing an index node by returning pointers to all data nodes that the index node points to either directly or indirectly via intermediary index nodes.

In some implementations, the system can be configured to store the received network telemetry data in a tree data structure having a top-level node pointing, via a plurality of index nodes to, a plurality of data nodes. Each data node can include a path, a data value, and a timestamp.

In some implementations, the network device can be a first network device, the set of network telemetry data can be a first set of network telemetry data, and the tree data structure can be a first tree data structure. The system can be configured to receive a second set of network telemetry data from a second network device. The system can be configured to store the second set of network telemetry data in a second tree data structure. The system can be configured to maintain a device-index map that stores, for each network device, a network device name and an indexed cache pointer pointing to a tree data structure corresponding to the network device name.

In some implementations, the system can include a first computing device including the one or more processors and the physical memory, and a second computing device including a second one or more processors and a second physical memory. The system can be configured to store the second tree data structure in a second memory space of the second physical memory.

In some implementations, the system can be configured to, during a read operation of a target data node, impose a write lock on the target data node, the write lock preventing any other process from reading from or modifying the target data node during the read operation. The system can be configured to impose a read lock on the top level node and any intermediary index nodes between the top-level node and the target data node, the read lock preventing any other process from modifying read locked nodes during the read operation.

In some implementations, the system can be configured to, during an update operation on a target data node, impose a write lock on the target data node, the write lock preventing any other process from reading from or modifying the target data node during the update operation. The system can be configured to impose a read lock on the top-level node and any intermediary index nodes between the top-level node and the target data node, the read lock preventing any other process from modifying read locked nodes during the update operation.

In some implementations, the system can be configured to, during an add operation or a delete operation on a target node (where the target node can be a data node or an index node), impose a write lock on the target node and a parent node pointing to the target node, the write lock preventing any other process from reading from or modifying write locked nodes during the add or delete operation. The system can be configured to impose a read lock on any index nodes preceding the parent node, the read lock preventing any other process from modifying read locked nodes during the add or delete operation.

At least one aspect is directed to a method of network telemetry caching and distribution. The method includes receiving, from a network device, a set of network telemetry data. The method includes storing, in a first memory space of the physical memory, the received network telemetry data as a plurality of data nodes. The method includes maintaining, in a second memory space of the physical memory, a client queue having a node pointer queue and a node pointer map. The node pointer map includes a plurality of node-pointer, node-count pairs. Each node pointer indicating a path to a data node corresponding to the node pointer, and the node count indicating a number of updates to the data node since a previous transmission of the contents of the data node to a client device. The method includes receive, from the network device, a data node update. If the data node update corresponds to a data node having a corresponding node pointer not already present in the node pointer map, the method includes adding the corresponding node pointer to the node pointer map with a count of zero and adding the corresponding node pointer to the node pointer queue. If the data node update corresponds to a data node having a corresponding node pointer already present in the node pointer map, the method includes incrementing the node count for the corresponding node pointer in the node pointer map and not adding the corresponding node pointer to the node pointer queue. The method includes transmitting, to the client device, a set of node-value, node-count pairs including, for each node pointer in the node pointer queue, a data value in the data node corresponding to the node pointer, and the node count in the node pointer map corresponding to the node pointer.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
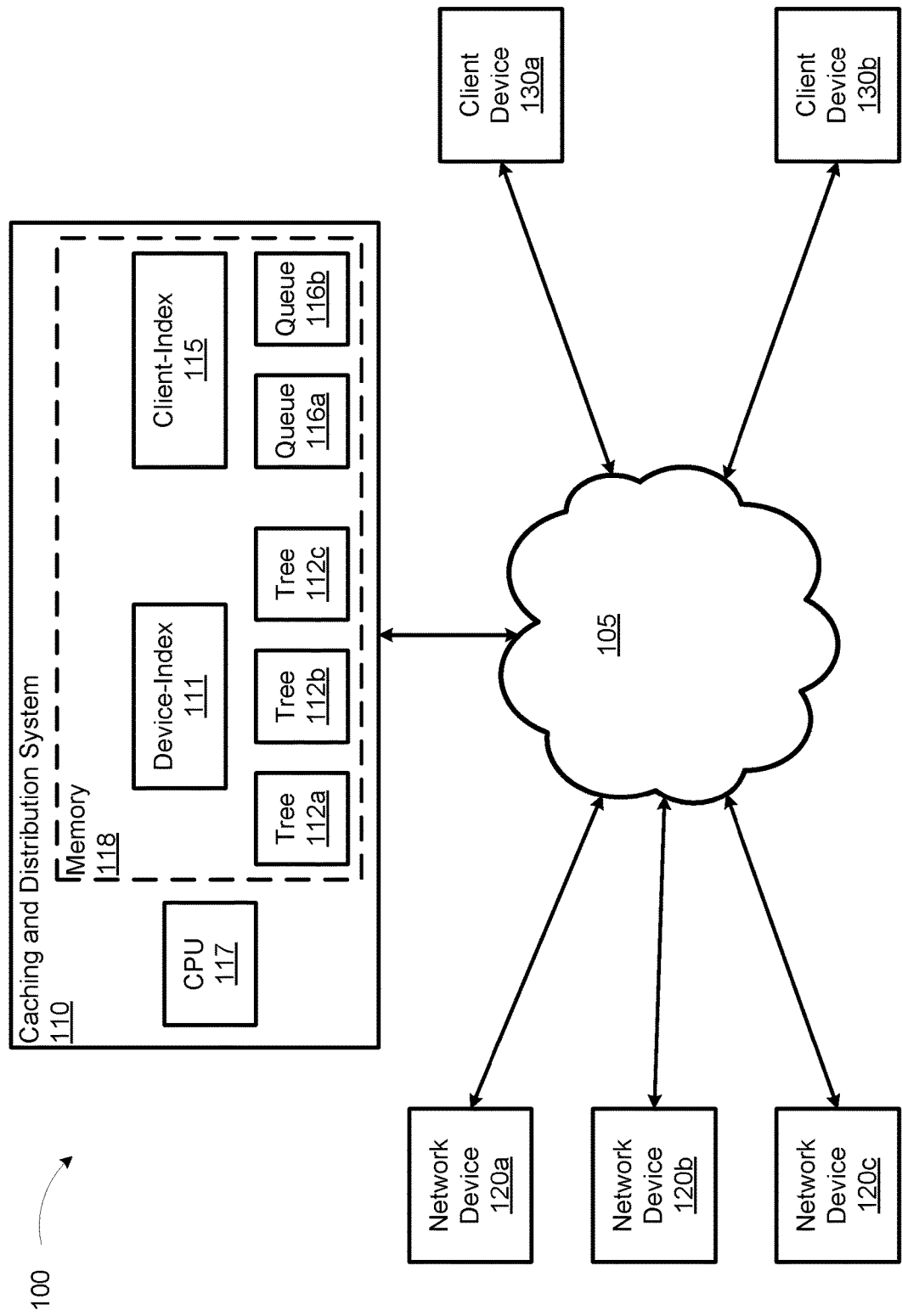
FIG. 1 illustrates an environment including a network telemetry caching and distribution system, according to an illustrative implementation.

This disclosure generally relates to a system and method of caching and distributing network telemetry data. The system can receive key-value-timestamp tuples of network telemetry data, store them in a tree data structure for ease of search and retrieval, and distribute them to clients via a client queue that maintains up-to-date network telemetry data even if the amount of data produced exceeds the ability of the client to process it.

The system can serve as a central hub for network telemetry updates from multiple network devices to multiple clients. In doing so, the system can reduce the query load on individual network devices and, in extreme cases, prevent denial of service attacks against the network devices.

The system can also serve as a queue for providing network telemetry updates to clients. A system receiving a query for a data set to the system has an obligation to provide the full set of data resulting from the request; however, certain network or client operating conditions may limit the client's ability to handle all of the data. Accordingly, the system can implement a client queue to ensure that the client receives up-to-date telemetry data even if it is not able to handle the full volume of the requested data, and to ensure that the data set does not disproportionately include data from frequently updated nodes.

The client queue can include a map of node pointers and counters, and a node pointer queue. The client queue ensures that data transmitted to the client is kept up to date while including an indication of any data node values dropped or skipped. An example operation of the client queue can occur as follows. At initiation, or following a complete transmission of network telemetry data to a client, the client queue can be cleared; that is, both the node pointer map and the node pointer queue will be empty. When the system receives a network telemetry data update from a network device, it can add or update a data node in the tree data structure, and add a corresponding node pointer to the data node in the client queue. If the node pointer map does not already include the pointer, the system can add the pointer to both the node pointer map, with a count equal to zero, and to the node pointer queue. If the map already includes the node pointer, the system can increment the node count (e.g., from zero to one), but not add the node pointer to the node pointer queue. In some implementations, the node pointer queue can be a first-in-first-out (FIFO) queue. For example, the node pointer queue can receive node pointers at its input, and return them from its output in the same order in which they were received. In some implementations, the network telemetry data can be transmitted to the client according to the output of the node pointer queue. Because the node pointer queue can operate in a first-in, first-out manner, transmission of network telemetry data to the client device can begin with the first data node value updated subsequent to the previous transmission of network telemetry data to the client device. In some implementations, the node pointer queue may include only a single copy of each pointer regardless of how many times the corresponding data node has been updated since initialization or the previous transmission to the client device; thus, the next transmission to the client device will not include a disproportionate amount of data from frequently updated data nodes. Rather, the data value from each data node will be sent once, along with its corresponding count. The count can indicate to the client the number of times the value of the corresponding data node has changed since the previously transmitted network telemetry data update. In this manner, the system can enable a client to determine its inability to handle the throughput of the network telemetry data updates, while continually providing updates for every unique node and preventing the client from becoming progressively further out of sync.

The system can provide network telemetry data to clients in various manners, illustrated by the following examples. A client device can submit a query for a set of data once and receive the resulting data set in response. The client device can submit a query for a set of data once and receive resulting data set repeatedly by submitting subsequent requests. The client can submit a query for a set of data and receive a complete set of resulting data once followed by continual updates as they are received from the network devices. The system can implement other manners of providing network telemetry data without departing from the scope of this disclosure.

The system can respond to queries for subpaths or globs of the tree data structure. For example, a query may contain only a partial path with a wildcard such as a "*". The partial path may indicate an index node. Responding to the query can include returning the respective values from all data nodes directly under the indicated index node, and all data nodes indirectly under the indicated index node via any daughter index nodes of the indicated index node.

The system can provide central caching for multiple network devices. To do so, the system can maintain a device-index map. Each entry in the device-index map can include a network device name and a pointer to an indexed cache corresponding to the network device. Each indexed cache can be an instance of the tree data structure described above specific to the network device. Isolating the caches for each network device avoids lock contention among computing devices within respective caches. And, in implementations where the system is distributed among multiple computing devices, the isolated caches allow for easy migration of tree data structures between the multiple computing devices, because adding or deleting an indexed cache only introduces minimal contention at the device-index map, and remains contention free at the indexed cache level (i.e., within the tree data structure).

The system can receive network telemetry data from multiple network devices in the form of key-value-timestamp tuples, and store the data in data nodes (leaves) of a tree data structure. Data collection can be performed, for example, according to the systems and methods described in co-pending U.S. patent application Ser. No. 15/343,876, filed Nov. 4, 2016, and entitled "Network Management Interface," the contents of which is incorporated herein. Each data node can include a full path (key), a data value, and a timestamp indicating when the data was produced by the network device. The tree data structure can also include index nodes forming an index for both updates and queries, including subpath queries that can return multiple values. The tree can include a top-level node and one or more tiers of index nodes. The first tier can include the top-level node, which can point to one or more index nodes in a second tier. Second-tier index nodes can each point to one or more index nodes in a third tier, and so on. An index node of the second or higher tiers can point to a data node.

The system can provide a mechanism of read and write locks to handle contention for index nodes and data nodes. Upon initiation, all nodes are inserted from scratch and the tree index must be built. From the top-level node, write locks are used when index nodes are added. For example, when a third-tier index node is added under a second-tier index node, the second-tier index node is write-locked, preventing any reading from, or writing to, or otherwise modifying of the second-tier index node. Similarly, when a data node and/or an index node is deleted, the index node above is write locked until the deletion is complete. When a data node is updated, it is write locked to prevent any reading from, or writing to, the data node. The parent index nodes above the data node being updated, however, need only be read locked, which prevents modification of those index nodes, but not their use for other read operations.

In some implementations, the system can translate network telemetry data from a vendor-specific format to a vendor-neutral format. In some cases, the network devices may not communicate network telemetry data using a consistent or standard format. For example, in some implementations, the network devices may have come from different vendors, may represent different models or model lines from a vendor, or may span both current and legacy devices. Therefore, in some situations, the vendor-specific network telemetry data produced by the various network devices may benefit from translation into a vendor-neutral format prior to being stored by the caching and distribution system. Such a system may benefit from a collection and translation system to process the various network telemetry data prior to use by the caching and distribution system.

FIG. 1 illustrates an environment 100 including a network telemetry caching and distribution system 110, according to an illustrative implementation. The environment 100 also includes one or more network devices 120a, 120b, and 120c (collectively "network devices 120") and one or more client devices 130a and 130b (collectively "clients 130"). The caching and distribution system 110, the network devices 120, and the client devices 130 can communicate with each other over a computer network 105. The computer network 105 can represent a secure, local-area network (LAN) such as a data center network, or an unsecure, wide-area network (WAN) such as the Internet. The caching and distribution system 110 includes a central processing unit (CPU) 117 and a memory 118. The memory 118 includes various indices and data structures such as a device-index 111; one or more tree data structures 112a, 112b, and 112c (collectively "tree data structures 112"); a client-index 115; and one or more client queues 116a and 116b (collectively "client queues 116").

Each network device 120 can be a switch, router, modem, gateway, software-defined-network application, or other component of computer network infrastructure. In some implementations, each network device 120 can be a computing device such as the computing system 1510 described below with reference to FIG. 14. Each network device 120 can receive and forward data packets and other network traffic to and from other network devices 120, hosts, servers, and/or client devices, including, for example, the client devices 130. In some implementations, the network devices 120 can operate in one or more software-defined networks (SDNs). In some implementations, the network devices can receive and forward data packets and other network traffic in a data plane, while exchanging messages in a control plane. The control plane messages can include control information and commands from SDN controllers. The control plane messages can also include status information regarding the network device 120. The status information can include network telemetry data. Generally speaking, network telemetry can refer to collecting information regarding network conditions and network device status as monitored or measured at the network device 120. The network device 120 can provide the network telemetry data to the caching and distribution system 110 and, in some implementations, directly to the client devices 130.

Each client device 130 can be a computer device involved in the control and/or monitoring of a computer network. In some implementations, each network device 120 can be a computing device such as the computing system 1510 described below with reference to FIG. 14. Each client device 130 can receive network telemetry data either directly from the network devices 120, or via a cached copy from the caching and distribution system 110. When querying for network telemetry data, the client device 130 has an obligation to receive all data responsive to the query. In some situations, however, a mismatch may arise between the volume of network telemetry data provided, and the client device's 130 ability to process it. For example, network conditions may limit the amount of data the network can convey in a given time period. In some situations, the type of data storage medium used by the client device 130 may limit the speed with which the client device 130 can store the data. To address a situation in which the caching and distribution system 110 is producing network telemetry data faster than the client device 130 can receive and process it, the caching and distribution system 110 can implement a client queue for that client. The client queue can buffer, and optionally coalesce, network telemetry updates destined for the client device. The client queue is discussed in more detail below with regard to the caching and distribution system 110, and also with reference to the client queue 700 described further below with reference to FIG. 7.

The caching and distribution system 110 can be a centralized or distributed system for receiving network telemetry data from one or more network devices 120, and providing the network telemetry data to one or more clients device 130. In some implementations, the caching and distribution system 110 can be a computing device such as the computing system 1510 described below with reference to FIG. 14. The caching and distribution system 110 can provide several benefits in the collection and distribution of network telemetry data. For example, the caching and distribution system 110 can reduce the number of entities querying a network device 120 for network telemetry data. This can reduce the load on the network device 120 and prevent denial-of-service events caused by the network device 120 receiving more queries than it can process. Another benefit is that the caching and distribution system 110 can collect the network telemetry data and store it in a client queue until a client device 130 is able to receive and process the data.

The caching and distribution system 110 includes the CPU 117 and the memory 118. The CPU 117 can include a computer logic device or system capable of executing instructions in the form of computer code such as a kernel, an operating system, one or more computer applications, or other types of executable computer code. The CPU 117 can include one or more microprocessor, application-specific integrated circuits (ASICs), field-programmable gate arrays (FPGAs), graphics processing unit (GPU), and/or other fixed or programmable logic devices. In some implementations, the CPU 117 can include the processor 1550 or computing system 1510 described below with reference to FIG. 14.

The memory 118 can include one or more memory devices including one or a combination of volatile and/or nonvolatile memory. The memory 118 can include random access memory (RAM), FLASH memory, magnetic memory such as a hard drive or tape drive, or optical memory such as optical disks. In some implementations, the memory 118 can include the cache 1575 and/or the memory 1570 described below with reference to FIG. 14. In some implementations, the memory 118 can be divided up into a number of memory spaces or regions. The various memory spaces can exist within the same physical memory device, or distributed across multiple physical memory devices. Each memory space can store one or more of computer program instructions, the device-index 111, one or more tree data structures 112, the client-index 115, and/or one or more client queues 116.

In some implementation, each tree data structure 112 can correspond to one of the network devices 120 in the environment 100. For example, the tree data structure 112a can store and index network telemetry data from the network device 120a, the tree data structure 112b can store and index network telemetry data from the network device 120b, and so on. The tree data structures 112 are described in further detail below with reference to FIGS. 2-6. The device-index 111 can be a map that stores, for each network device 120, a name of the network device 120 and an indexed cache pointer pointing to a tree data structure 112 corresponding to the network device 120. In some implementations, the device-index 111 allows for modularity and/or distribution of the tree data structures 112. For example, in some implementations, the caching and distribution system 110 may include multiple memories 118, with each memory storing a subset of the tree data structures 112. In some implementations, the environment 100 may include multiple caching and distribution systems 110, each responsible for receiving network telemetry data from a different subset of the network devices 120, and for storing a subset of the tree data structures 112. In systems that are distributed in this manner, the device-index 111 provides a map to the various tree data structures 112. The device-index 111 can be readily updated by the caching and distribution system 110 if a particular tree data structure 112 is moved to another memory 118 or another caching and distribution system 110.

In some implementations, each client queue 116 can correspond to a particular client device 130 in the environment 100. For example, the client queue 116a can buffer data intended for the client device 130a, the client queue 116b can buffer data intended for the client device 130b, and so on. The client-index 115 can be a map that stores, for each client device 130, a name of the client device 130 and an indexed cache pointer pointing to a client queue 116 corresponding to the client device 130. Similar to the device-index 111, the client-index 115 facilitates modularity of the system by providing a map linking individual client queues 116 to their corresponding client device 130, regardless of where the particular client queue 116 is stored.

The caching and distribution system 110 can receive network telemetry data from the network devise 120 and provide caching and distribution services to the client devices 130. The following is a description of an example operation of the caching and distribution system 110. The caching and distribution system 110 can receive network telemetry data from a network device 120. The caching and distribution system 110 can store the received network telemetry data in the memory 118. The caching and distribution system 110 can store the received network telemetry data as a plurality of data nodes and/or updates to existing data nodes. In some implementations, the caching and distribution system 110 can store the data nodes in a tree data structure 112. The caching and distribution system 110 can also maintain a client queue 116 in the memory 118. The client queue 116 can include a node pointer queue and a node pointer map. The node pointer map can include a plurality of node-pointer, node-count pairs. Each node-pointer can indicate a path to a data node corresponding to the node-pointer. Each node-count indicates the number of updates to the data node elapsing since a previous transmission of the contents of the data node to the client device 130. Operation of the client queue 116 is described in further detail below with reference to FIG. 7. The caching and distribution system 110 can transmit, to the client device 130, network telemetry data a from the client queue 116. The data can include node-value, node-count pairs including, for each node pointer in the node pointer queue, a data value in the data node corresponding to the node-pointer, and the node-count corresponding to the node-pointer in the node pointer map.

These and other operations of the caching and distribution system 110 are described below with reference to FIGS. 2-13.

Figure 2:
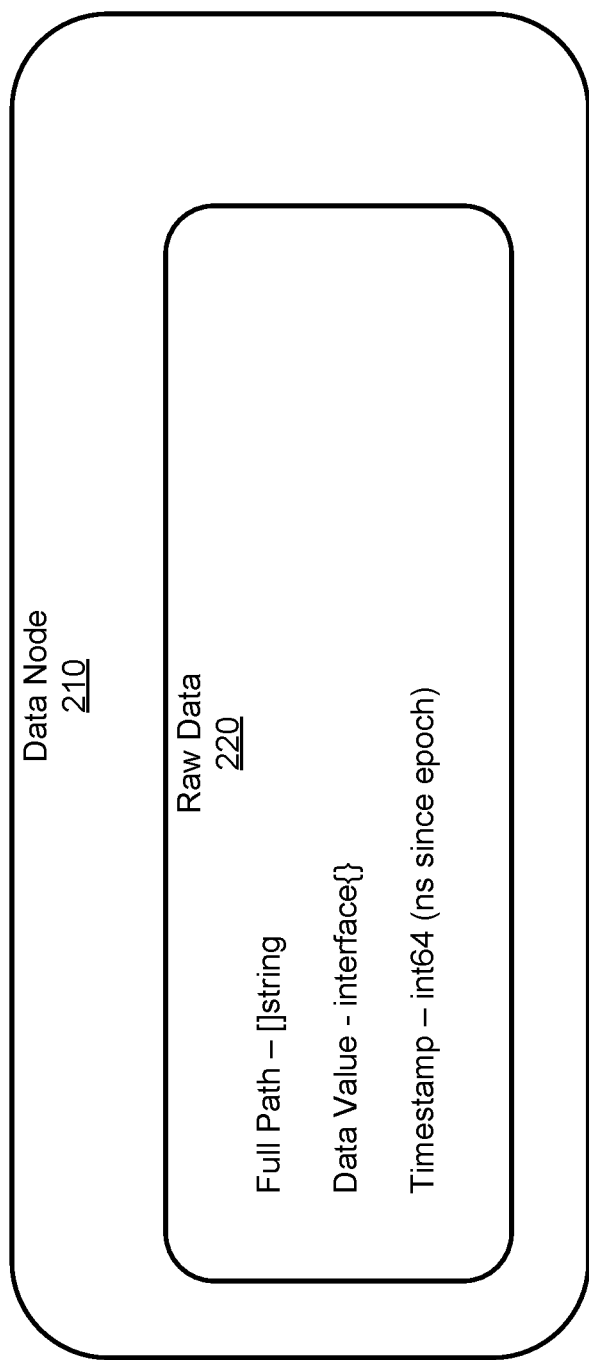
FIG. 2 shows an example data node, according to an illustrative implementation.

FIG. 2 shows an example data node 210, according to an illustrative implementation. The data node includes raw data 220. The raw data 220 can be thought of as a group of key-value-timestamp tuple. Each key-value-timestamp tuple is stored in a wrapper structure that can enable synchronization for read-write access. Each key can be a unique list of strings making it suitable for insertion into a tree data structure where leaves contain the values and timestamps. An example tree data structure is described below with reference to FIG. 3.

The raw data 220 can include a full path of the data node 210 in a tree data structure. The full path can be a string data type. The raw data 220 can include a data value. The data value represents a quantitative measurement of some aspect of network telemetry. The data value can be an interface data type. In some implementations, the raw data 220 can include a timestamp. The timestamp can represent the amount of time elapsed since a previous synchronizing event. For example, the timestamp can be an 64-bit integer value data type that can record, for example, how many nanoseconds since the Unix epoch had elapsed when the data value was recorded. The data node 210 can include more or fewer pieces of raw data 220 without departing from the scope of this disclosure.

Figure 3:
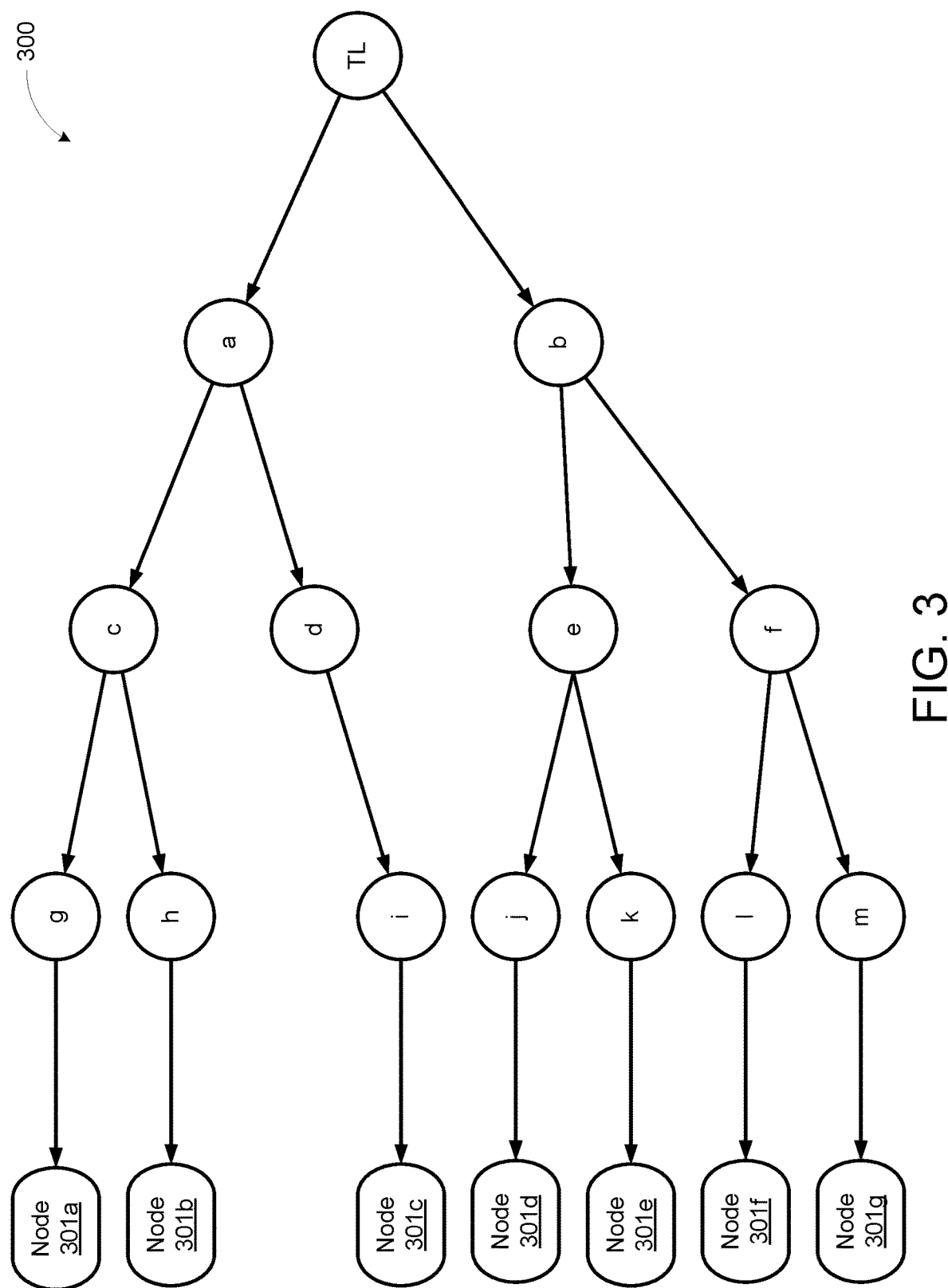
FIG. 3 shows an example tree data structure, according to an illustrative implementation.

FIG. 3 shows an example tree data structure 300, according to an illustrative implementation. The tree data structure 300 includes a collection of data nodes 301a-301g (collectively "data nodes 301"). The data nodes 301 can be similar to the example data node 210 previously described. The right side of the tree data structure 300 shows a tree index. The tree index can be used for both updates and for queries.

The tree index includes an arrangement of index nodes branching out from a top-level node (TL) and pointing to the collection of data nodes 301. The index nodes can make up a tiered data structure with the TL node in a first tier, index nodes a and b in a second tier, index nodes c through f in a third tier, index nodes g through m in a fourth tier, and the data nodes 301 making up the "leaves" of the data structure. In the tree data structure 300, a higher-tier node is said to be the parent of a lower-tier node to which it points, and the lower-tier node to which the parent node points is said to be the daughter. In the tree data structure 300, the TL node is the parent of each of the second-tier nodes a and b. Node a is the parent of the third-tier nodes c and d. Node b is the parent of the third-tier nodes e and f. Node c is the parent of fourth-tier nodes g and h. Node d is the parent of fourth-tier node i. Node e is the parent of fourth-tier nodes j and k. Node f is the parent of fourth-tier nodes l and m. Node g is the parent of data node 301a, node h of data node 301b, node i of data node 301c, node j of data node 301d, node k of data node 301e, node l of the data node 301f, and index node m of the data node 301g.

The network telemetry caching and distribution system 110 can execute queries by traversing the tree data structure 300 according to a search path. The network telemetry caching and distribution system 110 can use a read lock function to avoid changes in the tree data structure 300 disrupting the execution of the query. The read lock function can prevent alterations of any index nodes or data nodes currently involved in executing a query.

The network telemetry caching and distribution system 110 and also add, update, and delete data nodes and index nodes from the tree data structure 300. The network telemetry caching and distribution system 110 can use a combination of read locks and write locks to prevent the changes in the tree data structure 300 from disrupting the execution of the query. The read lock can prevent the alteration of nodes, as previously described, and the write lock can prevent a write locked node from being read as well as being altered.

Operation of read locks and write locks are described further below with reference to FIGS. 4 through 6.

Figure 4:
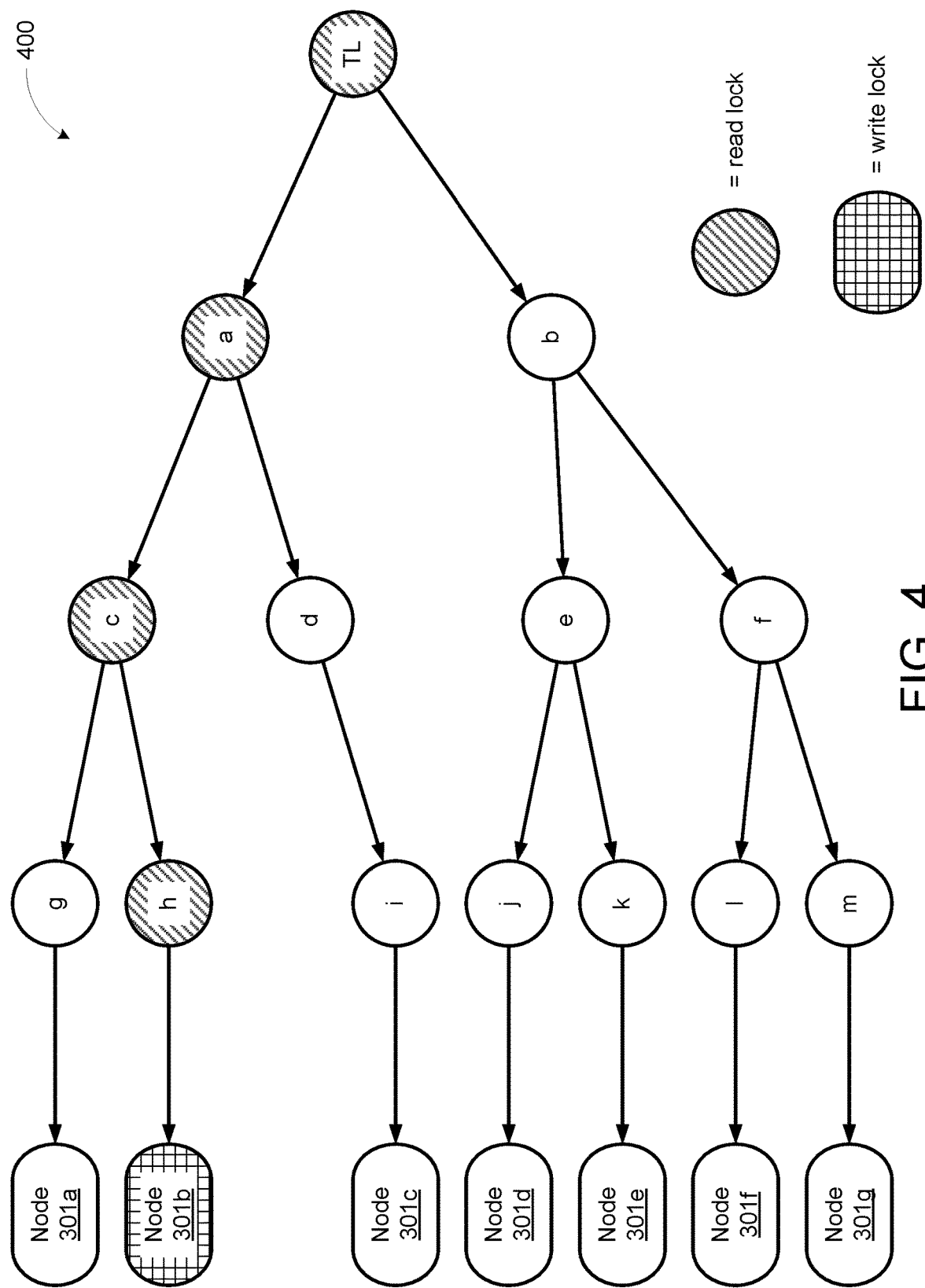
FIG. 4 shows an example tree data structure employing read locks and write locks as a data node is updated, according to an illustrative implementation.

FIG. 4 shows an example tree data structure 400 employing read locks and write locks as data node 301b is updated, according to an illustrative implementation. The tree data structure 400 includes the same TL node, index nodes, and data nodes 301 as the tree data structure 300 described above with reference to FIG. 3. In the tree data structure 400, the data node 301b is being updated based on a network telemetry update received by the caching and distribution system. While the data node 310b is being updated, the caching and distribution system can impose a write lock to prevent any reading from, or modifications to, the data node 310b. The write lock can prevent both disruption of the update as well as the integrity of any read operations attempted on the data node 301b.

In addition to the write lock applied to the data node 310b, the caching and distribution system can impose a read lock on any parent index nodes of the data node 310b. In particular, the caching and distribution system can impose a read lock on the TL node as well as index nodes a, c, and h. The read lock can prevent any modifications to the TL node and the index nodes a, c, and h. The read lock can prevent disruption of the update to the data node 301b, while allowing other read operations involving the TL node and the index nodes a, c, and h.

Figure 5:
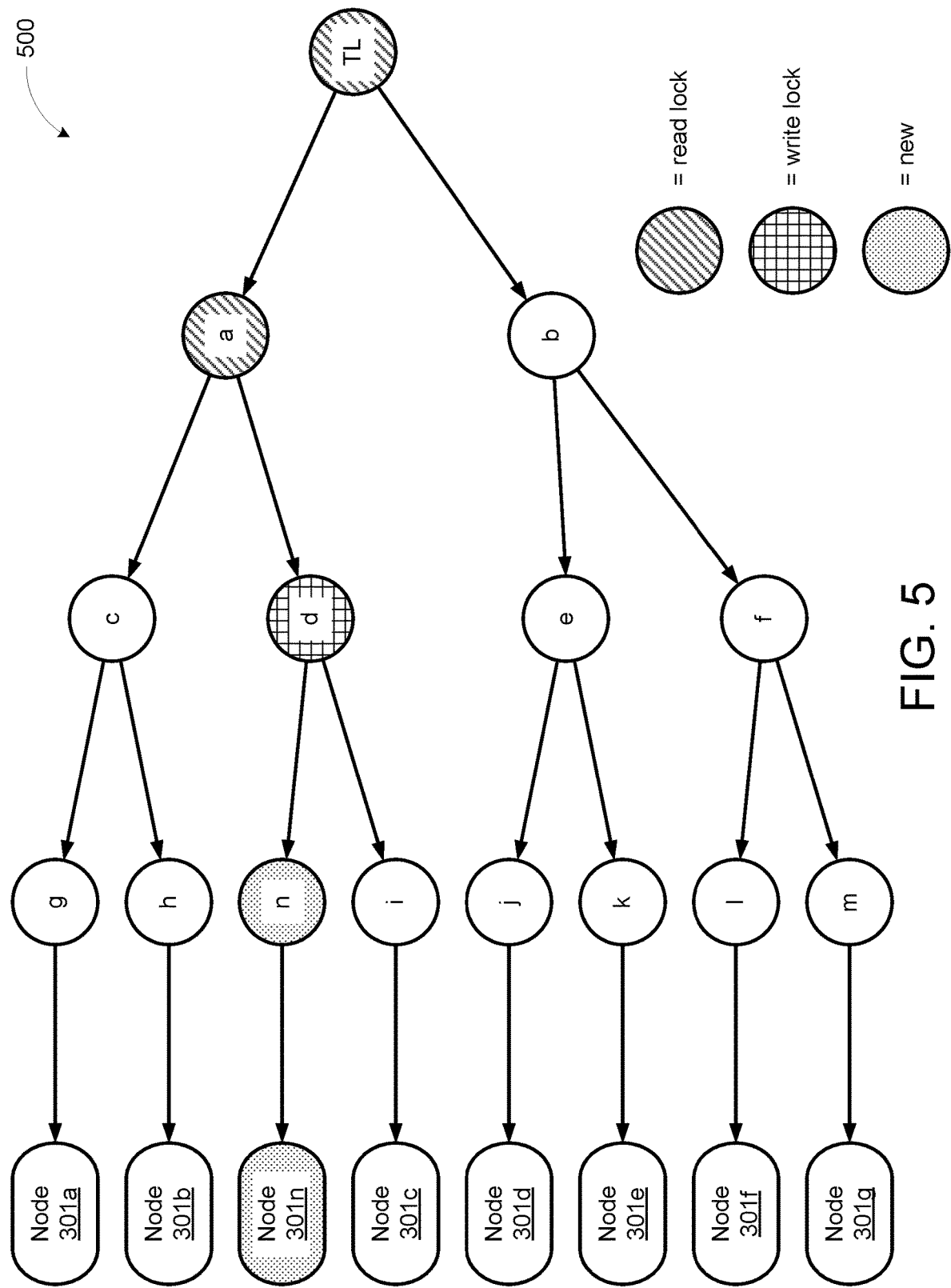
FIG. 5 shows an example tree data structure employing read locks and write locks as a new data node is added, according to an illustrative implementation.

FIG. 5 shows an example tree data structure 500 employing read locks and write locks as a new data node 301n is added, according to an illustrative implementation. The tree data structure 500 includes the same TL node, index nodes, and data nodes 301 as the tree data structure 300 described above with reference to FIG. 3. In the tree data structure 500, the new data node 301n is being added based on network telemetry data received by the caching and distribution system. The addition also includes a new index node n that is the parent of the new data node 301n. While the new data node 310n is being added, the caching and distribution system can impose a write lock to prevent any reading from, or modifications to, the index node d that is the parent of the new index node n. The write lock can prevent both disruption of the addition as well as the integrity of any read operations that involve index node d, which may, due to the addition, undergo a change of state and thus may be unstable in its response to a read operation.

In addition to the write lock applied to index node d, the caching and distribution system can impose a read lock on any parent index nodes of index node d. In particular, the caching and distribution system can impose a read lock on the TL node as well as index node a. The read lock can prevent any modifications to the TL node and the index node a. The read lock can prevent disruption of the addition of the new data node 301n and new index node n, while allowing other read operations involving the TL node and the index node a.

The network telemetry caching and distribution system 110 can execute queries by traversing a tree data structure according to a search path provided in the query. In some implementations, the search path can be a complete path that defines a single data node. In some implementations, the search path can be a subpath that may encompass multiple data nodes.

FIGS. 6A-6F shows an example tree data structure 600 during execution of an example subpath query, according to an illustrative implementation. The tree data structure 600 includes the same TL node, index nodes, and data nodes 301 as the tree data structure 300 described above with reference to FIG. 3. Each of FIGS. 6A-6F illustrates a stage of a query for the subpath "/*/c". This subpath, or "glob," query is intended to retrieve data from each data node 301 that has a path including /c. In other words, the query is intended to retrieve data from each data node 301 that is, either directly or indirectly, a daughter of index node c. The caching and distribution system can process the query and return to the querying entity the data from each data node 301 in the subpath.

Figure 6B:
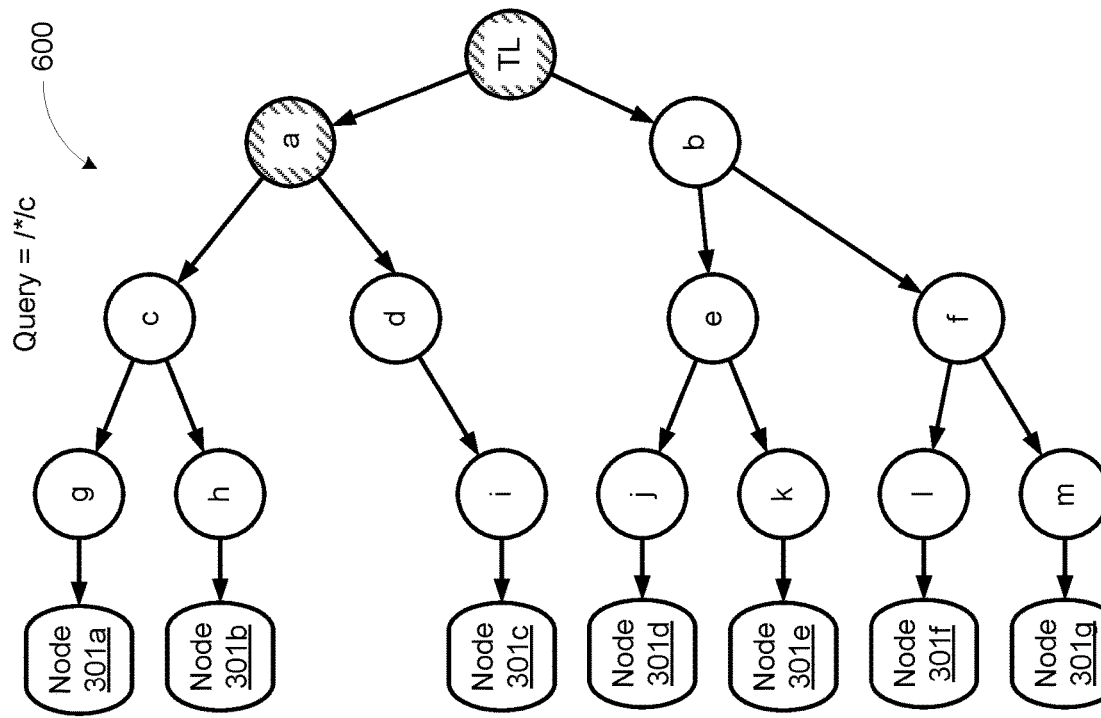
FIGS. 6A-6F show an example tree data structure during execution of an example subpath query, according to an illustrative implementation.
Figure 6A:
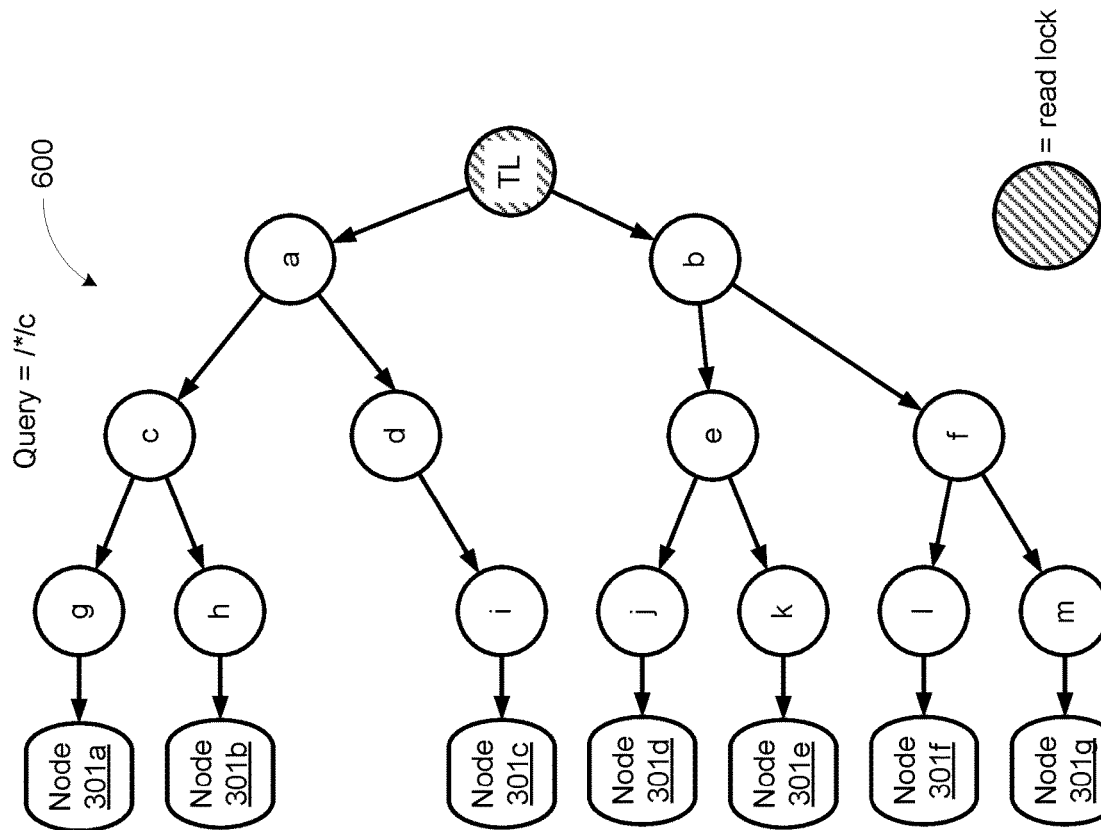

In FIG. 6A, execution of the query begins at the TL node. The caching and distribution system can impose a read lock on the TL node. The read lock can prevent any modification to the read-locked node while allowing other read operations involving the read-locked node. In FIG. 6B, execution of the query continues to index node a. The caching and distribution system can impose a read lock on index node a. In FIG. 6C, execution of the query continues to index node c. The caching and distribution system can impose a read lock on index node c. Because the query specifies the sub path "/c", which includes index node c, the caching and distribution system and proceed to retrieve data from each data node 301 that is, either directly or indirectly, a daughter of index node c.

Figure 6D:
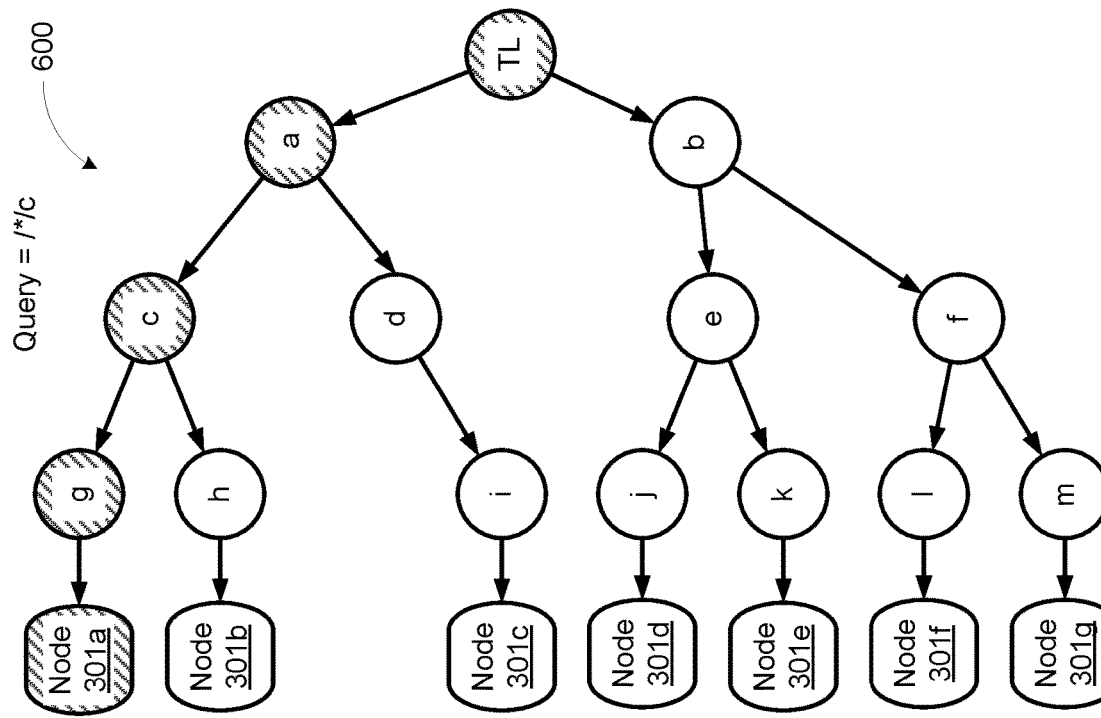
Figure 6C:
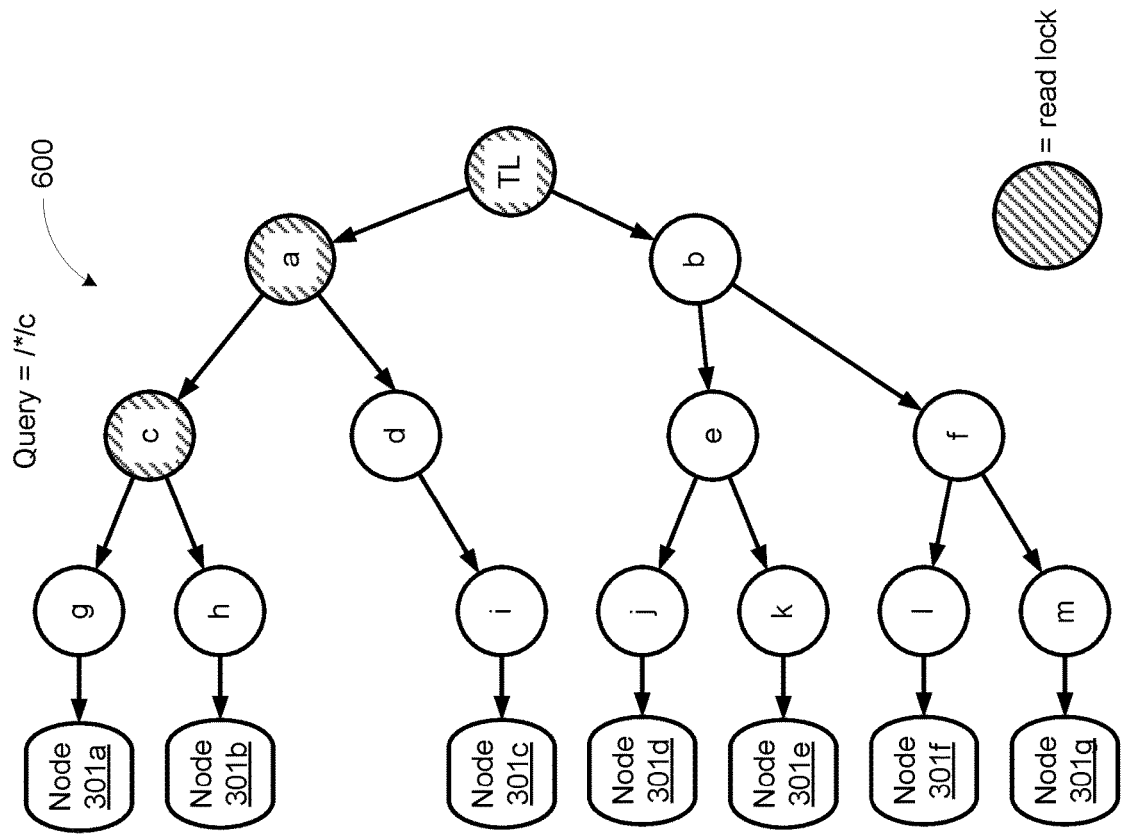
Figure 6F:
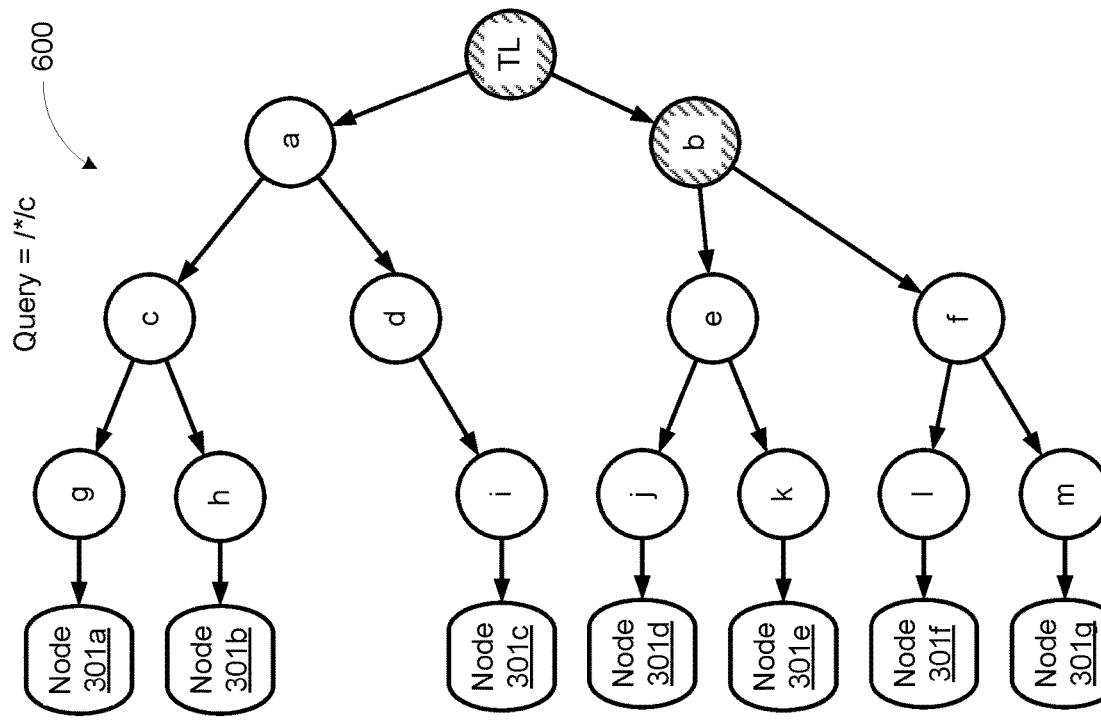
Figure 6E:
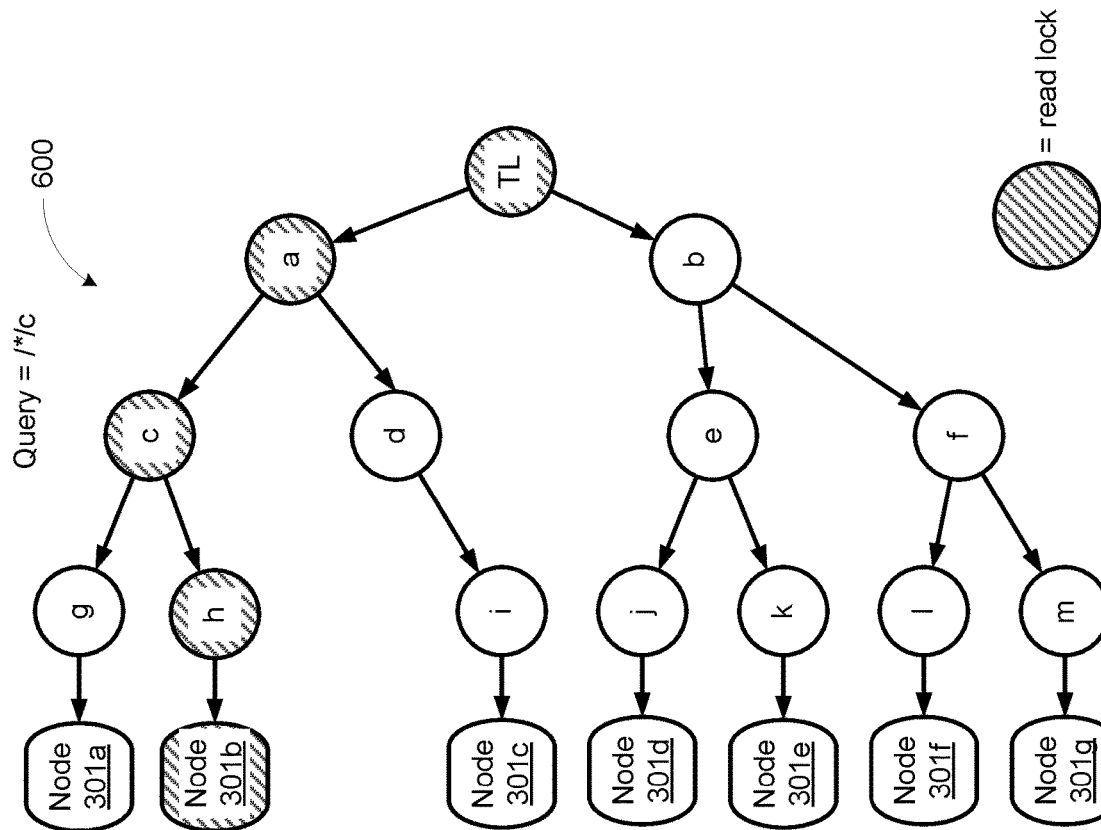

In FIG. 6D, execution of the query continues to index node g and to the data node 301a. The caching and distribution system can impose a read lock on index node g and the data node 301a. The caching and distribution system can retrieve a data value from the data node 301a. In FIG. 6E, execution of the query continues to index node h and to the data node 301b. The caching and distribution system can impose a read lock on index node h and the data node 301b. The caching and distribution system can retrieve a data value from the data node 301b.

Having retrieved data values from all of the data nodes 301 under index node c and index node a, the query can continue scanning the data tree 600 for other data nodes 301 satisfying the query. In FIG. 6F, execution of the query continues to index node b. The caching and distribution system can impose a read lock on index node b. The caching and distribution system can determine that no other data nodes 301 under index node b satisfy the query. The caching and distribution system can thus complete execution of the query.

Figure 7:
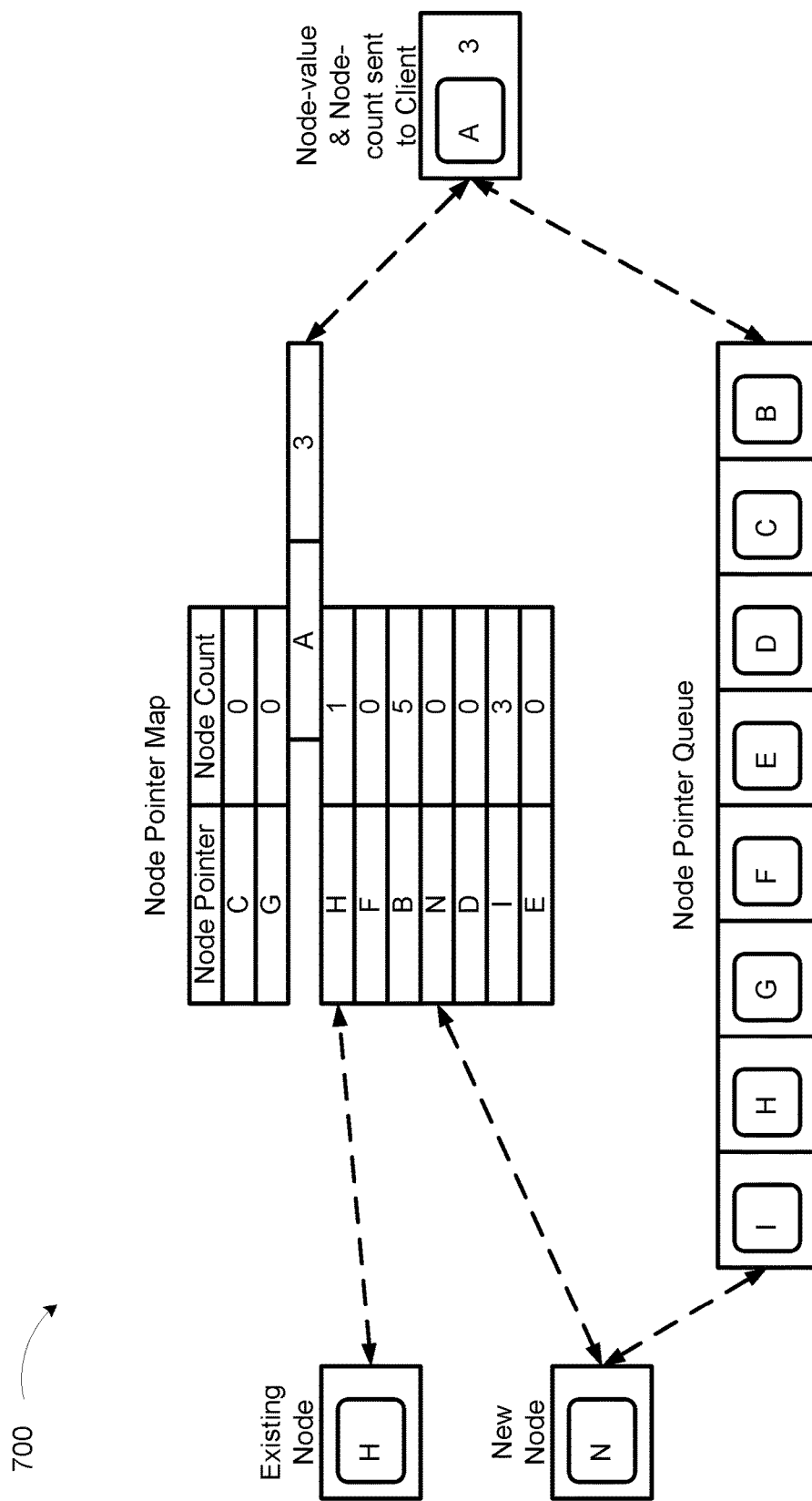
FIG. 7 shows an example client queue including a node pointer map and a node pointer queue, according to an illustrative implementation.

FIG. 7 shows an example client queue 700 including a node pointer map and a node pointer queue, according to an illustrative implementation. The example client queue 700 can represent network telemetry data queued for a client device, such as the client device 130 described previously. In some implementations, the caching and distribution system may maintain a client queue for each client device serviced by the caching and distribution system. The node pointer map includes a data structure holding node-pointer, node-count pairs. For example, a first node-pointer, node-count pair includes a node pointer to a data node "C" and a node count of zero. The node count equal to zero indicates that the data in data node C has not been updated since the last transmission of node-pointer, node-count pairs to the client device. Another node-pointer, node-count pair includes a node pointer to a data node "B" and a node count of 5. The node count equal to 5 indicates the data value in data node B has been updated five times since the last transmission of node-value, node-count pairs to the client device. This relatively high count may indicate that the data in data node B is frequently updated by receipt of network telemetry data updates from a network device, such as the network device 120 described previously.

The node pointer queue can include zero, one, or many node pointers. In the example client queue 700, the node pointer queue includes eight node pointers: I, H, G, F, E, D, C, and B. The node pointer queue can include a node pointer corresponding to each data node that has been updated since a previous transmission of node-value, node-count pairs to the client device. In some implementations, the node pointer queue only includes a single copy of any particular node pointer, regardless of how many times the corresponding data node has been updated since a previous transmission of data to client. In some implementations, the node pointer queue is a first-in-first-out (FIFO) queue. For example, in the example client queue 700, the node pointer to data node B was the first node pointer added to the node pointer queue, and will be the first node pointer transmitted to the client device during the next transmission. In this manner, the oldest data node will have its data transmitted first. Meanwhile, the node pointer to data node I was the last node pointer added to the node pointer queue, and may be the last node pointer transmitted to the client device during the next transmission, if no other node pointers are added to the node pointer queue. When the caching and distribution system is ready to transmit node-value, node-count pairs to the client device, it can retrieve data values corresponding to each node pointer in the node pointer queue, and combine them with the corresponding node count in the node pointer map.

The example client queue 700 illustrates three operations: an item of network telemetry data received in the first instance, an update to an item of network telemetry data, and a transmission of a node-value, node-count pair from the example client queue 700 to the client device.

The example client queue 700 illustrates an item of network telemetry data received in the first instance. The example client queue 700 is receiving a node pointer to a new data node N. The caching and distribution system can check the node pointer map to see if it already includes an entry for data node N. In this case, the example client queue 700 does not include an entry for data node N, thus such a new entry is added with a node count set to zero. The node pointer to the data node N is also added to the node pointer queue.

The example client queue 700 illustrates an update to an item of network telemetry data. The example client queue 700 is receiving a node pointer to a data node H that has been updated. The caching and distribution system can check the node pointer map to see if it already includes an entry for data node H. In this case, the example client queue 700 does include an entry for data node H, thus no new entry is added; rather, a node count corresponding to the node pointer to data node H is incremented to 1. The node count of 1 indicates that the data node H has been added to the example client queue 700 and updated once since the last transmission to the client. This means that the client will not receive the previous data value stored in the data node H prior to the most recent update; the client will, however, be informed that it has missed the previous data value. Because the node pointer to the data node H already had an entry in the node pointer map, no corresponding node pointer is added to the node pointer queue. By not adding node pointers that already exist in the node pointer map to the node pointer queue, the client queue 700 avoids transmitting to the client device a disproportionate number of updates corresponding to frequently updated data nodes.

The example client queue 700 illustrates a transmission of a node-value, node-count pair from the example client queue 700 to the client device. When the caching and distribution system is ready to transmit node-value, node-count pairs to the client, it can retrieve data values corresponding to each node pointer in the node pointer queue, coupled with the corresponding node count in the node pointer map. For example, in the example client queue 700, the caching and distribution system is preparing to send node-value, node-count pairs to the client. The first node-value, node-count pair can correspond to the data node A, which has a node count of 3. The node count of 3 indicates that the data node A has been added to the example client queue 700 and updated three times since the last transmission to the client. This means that the client device will not receive the previous three data values stored in the data node A prior to the most recent update; the node count will inform the client device, however, that it has missed the previous data values. When a node-value, node-count pair is transmitted to the client, the node pointer can be removed from the node pointer queue.

An example method of operation of the a caching and distribution system employing a client queue is described below with reference to FIG. 8.

Figure 8:
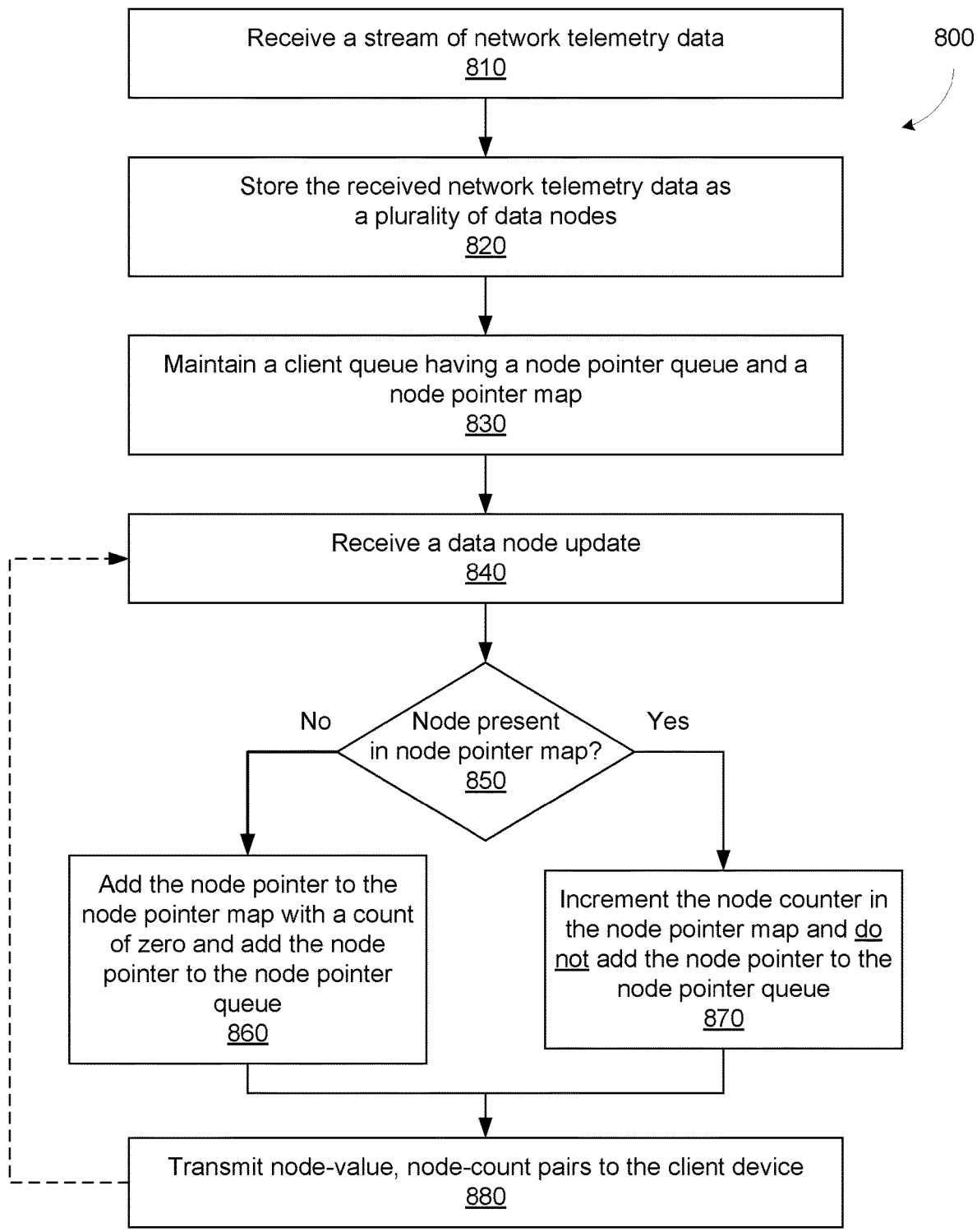
FIG. 8 shows a flowchart of an example network telemetry caching and distribution method, according to an illustrative implementation.

FIG. 8 shows a flowchart of an example network telemetry caching and distribution method 800, according to an illustrative implementation. The method 800 includes receiving a set of network telemetry data (stage 810). The method 800 can be executed by a caching and distribution system such as the caching and distribution system 110 previously described with reference to FIG. 1. The method 800 includes storing the received network telemetry data as a plurality of data nodes (stage 820). The method 800 includes maintaining a client queue having a node pointer queue and a node pointer map (stage 830). The method 800 includes receiving a data node update (stage 840). The method 800 includes determining whether the pointer map already includes a node pointer corresponding to the updated data node (decision block 850). If the node pointer map does not include a node pointer corresponding to the updated data node, the method 800 includes adding a node pointer corresponding to the updated data node to the node pointer map with a count of zero, and adding the node pointer to the node pointer queue (stage 860). If the node pointer map does include a node pointer corresponding to the updated data node, the method 800 includes incrementing the node count corresponding to the updated data node, and not adding the node pointer to the node pointer queue (stage 870). The method 800 includes transmitting node-value, node-count pairs to the client device (stage 880).

The method 800 includes receiving a set of network telemetry data (stage 810). The caching and distribution system can receive the set of network telemetry data from a network device, such as the network device 120 previously described.

The method 800 includes storing the received network telemetry data as a plurality of data nodes (stage 820). The caching and distribution system can store the received network telemetry data in a physical memory, such as the memory 118. The caching and distribution system can store the received network telemetry data as a plurality of data nodes. In some implementations, the caching and distribution system can store the received network telemetry data in a tree data structure having a top-level node pointing, via a plurality of index nodes, to a plurality of data nodes. Each data node can include a path, a data value, and a timestamp. Each data node can be similar to the data node 210 or the data node 301 described previously. The tree data structure can be similar to the tree data structures 300, 400, 500, and 600 described previously.

The method 800 includes maintaining a client queue having a node pointer queue and a node pointer map (stage 830). The caching and distribution system can maintain the client queue in a second memory space of the physical memory. The client queue can be, for example, the example client queue 700 described previously. The client queue can include a node pointer queue and a node pointer map. The node pointer map can include a plurality of node-pointer, node-count pairs. Each node-pointer can indicate a path to a data node corresponding to the node-pointer. The node-count can indicated the number of updates to the data node that have elapsed since a previous transmission of the contents of the data node to a client device. The client device can be a client device 130 previously described with reference to FIG. 1. The client queue can correspond to a particular client device. In some implementations, the caching and distribution system can maintain multiple client queues, each client queue corresponding to a different client device.

The method 800 includes receiving a data node update (stage 840). The caching and distribution system can receive the data node update from the network device. The method 800 includes determining whether the node pointer map already includes a node pointer corresponding to the updated data node (decision block 850). If the node pointer map does not include a node pointer corresponding to the updated data node, the method includes adding a node pointer corresponding to the updated data node to the node pointer map with a count of zero, and adding the node pointer to the node pointer queue (stage 860). In some implementations, the node pointer queue can be a first-in-first-out (FIFO) queue that receives node-pointers at its input, and provides the node-pointers at its output in the order in which they were received.

If the node pointer map does include a node pointer corresponding to the updated data node, the method includes incrementing the node count corresponding to the updated data node, and not adding the node pointer to the node pointer queue (stage 870). In this manner, any particular node pointer is only added once to the node pointer queue between transmissions of network telemetry data to the client device. This can prevent frequently updated data nodes from being disproportionately represented in the set of network telemetry data transmitted to the client device and can ensure that a node that has only been updated once is transmitted to the client device. In some implementations, the client device will only receive one data value for a given data node per transmission. The node count, however, can serve to inform the client device of how many data node updates it has not received since the previous transmission of network telemetry data. This information can be used for monitoring and diagnostic purposes, and inform an administrator of the client device that steps may need to be taken to improve the client device's ability to process all of the requested data.

The method 800 includes transmitting node-value, node-count pairs to the client device (stage 880). The caching and distribution system can transmit a set of node-value, node-count pairs to the client device. In some implementations, the caching and distribution system can begin transmitting the contents of the client queue after receiving indication from the client device that it is ready to receive data. The node-value, node-count pairs can include, for each node pointer in the node pointer queue, a data value in the data node corresponding to the node pointer, and the node count in the node pointer map corresponding to the node pointer. The caching and distribution system can use the node pointer queue to determine from which data nodes to pull data values for transmission to the client device. As stated above, the node pointer queue may only include a single copy of any particular node pointer, regardless of how many times the corresponding data node has been updated since a previous transmission of network telemetry data to the client device. In some implementations, the caching and distribution system can transmit the set of node-value, node-count pairs to the client device responsive to receiving a query from the client device, where the set of node-value, node-count pairs includes data responsive to the query. The caching and distribution system can provide network telemetry data to client devices in various manners. For example, the caching and distribution system can receive a query submitted from a client device, and provide a resulting data set in response. In another example, the caching and distribution system can receive a query submitted from a client device, provide the resulting data set in response, and provide updated resulting data sets in response to future requests from the client device, where the request need not repeat the query. In yet another example, the caching and distribution system can receive a query submitted from a client device, provide the resulting data set in response, and provide continual updates to the client device as they are received from the network devices. The caching and distribution system can implement other manners of providing network telemetry data to the client device without departing from the scope of this disclosure. In some implementations, a query can include a subpath representing an index node and all data nodes that are daughters, either directly or indirectly, of the index node specified by the subpath. In some implementations, the caching and distribution system can employ a scheme of read and write locks when adding, updating, or deleting data nodes and index nodes, as previously discussed with reference to FIGS. 4-6. In some implementations, the method 800 can continue cyclically by returning to stage 840, receiving additional data node updates, and repeating the intervening stages.

Figure 9:
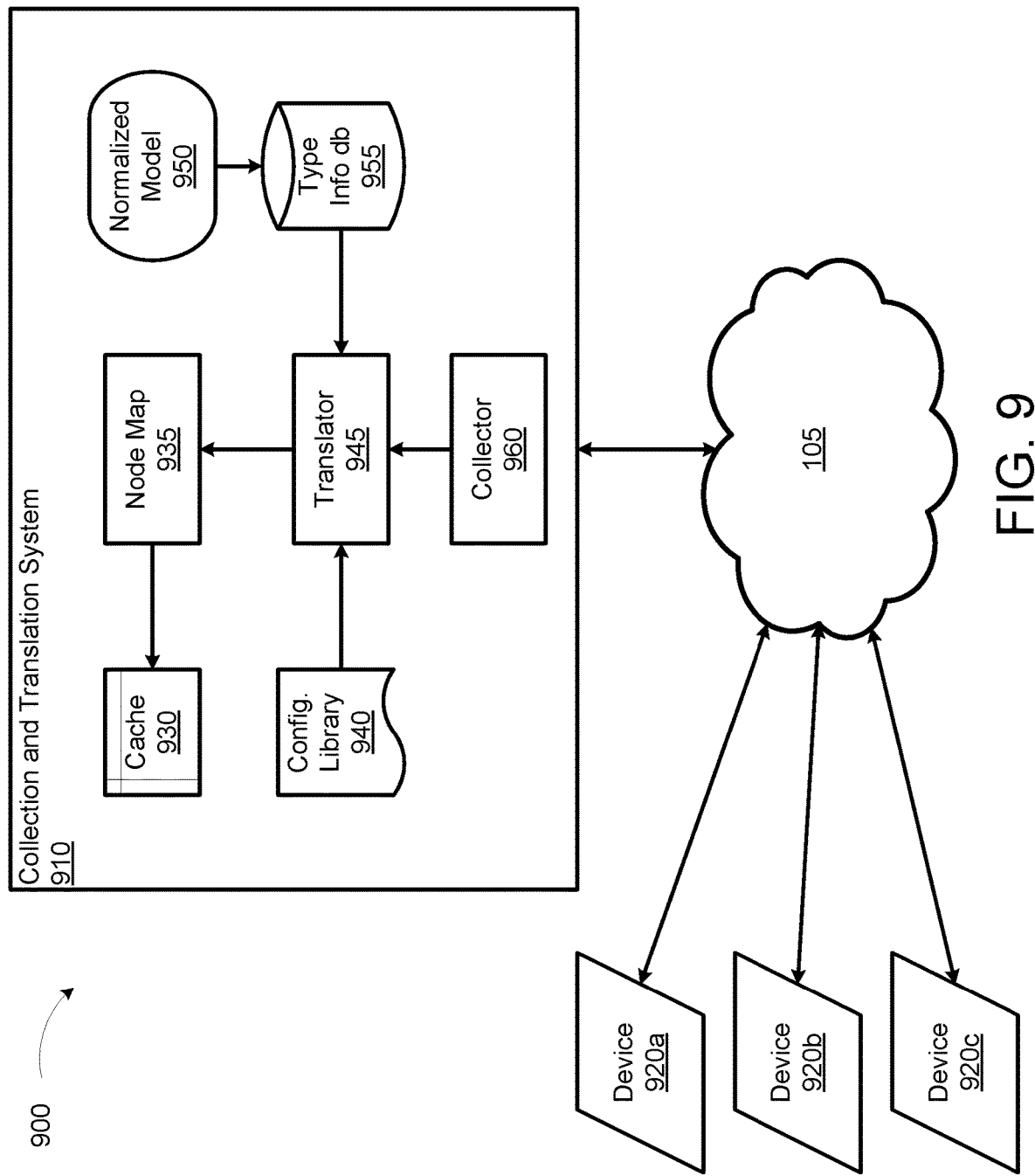
FIG. 9 shows an example environment including a network telemetry collection and translation system, according to an illustrative implementation.

FIG. 9 shows an example environment 900 including a network telemetry collection and translation system 910, according to an illustrative implementation. The environment 900 includes network devices 920*a*, 920*b*, and 920*c* (collectively "network devices 920") communicating with the collection and translation system 910 via a network 105. The network devices 920 can be similar to the network devices 120 previously described. In some cases, the network devices 920 may not communicate network telemetry data using a consistent or standard format. For example, in some implementations, the network devices 920 may have come from different vendors, may represent different models or model lines from a vendor, or may span both current and legacy devices. Therefore, in some situations, network telemetry data produced by the various network devices 920 may benefit from translation into a vendor-neutral format prior to being stored by the caching and distribution system 110. Such a system may benefit from a collection and translation system 910 to process the various network telemetry data prior to use by the caching and distribution system 110.

The collection and translation system 910 can be a computing device such as the computing system 1510 described below with reference to FIG. 14. The collection and translation system 910 includes a cache 930, a node map 935, a configuration library 940, a translator 945, a normalized data model 950, a type information database 955, and a collector 960.

The collector 960 can establish a connection with a network device, receive network telemetry data from the network device in the form of streaming update packets, unpack the packets, deserialize the relevant data, and pass the data on to the translator 945. The network telemetry data can include a data value and a data path that identifies the data. In some implementations, the data value and the data path may be in vendor-specific formats.

The normalized data model 950 can include data models based on a vendor neutral format; for example, OpenConfig. The normalized data model 950 can be expressed in a data modeling language such as YANG for all data related to the network devices 920. The normalized data model 950 can represent the vendor-neutral data model that the collection and translation system 910—and, by extension, the caching and distribution system 110—uses to present the network telemetry data to client devices. Basically, the standards will organize all data about a network device under a tree data structure. Any data about a network device can be accessed via a path defined by the normalized data model. This path can be referred to as a "standardized" or "vendor-neutral" path.

The type information database 955 can include compiled data type information defined in the normalized data model 950. The type information database 955 can be utilized by the translator 945 to perform type conversion for network telemetry data from vendor-specific formats to a vendor-neutral format.

The configuration library 940 can include configuration files with information that can indicate which vendor-specific paths should map to which vendor-neutral paths. In some implementations, the configuration files can be encapsulated into human-editable configuration files so that the code doing the actual mapping and/or translation can be more generic.

The translator 945 can receive the vendor-specific notifications from the collector 960, translate them into vendor-neutral notifications using the information from the type information database 955 and the configuration library 940, and pass the translated vendor-neutral notifications to the node map.

The node map 935 can store the vendor-neutral data previously translated by the translator 945. The node map 935 can store the vendor-neutral data in an in-memory cache, such as the cache 930, and notify a publisher for streaming the updates to subscribers such as the caching and distribution system 110 and/or the client devices 130.

The operations of the collection and translation system 910 are described in further detail below with regard to FIGS. 10-13.

Figure 10:
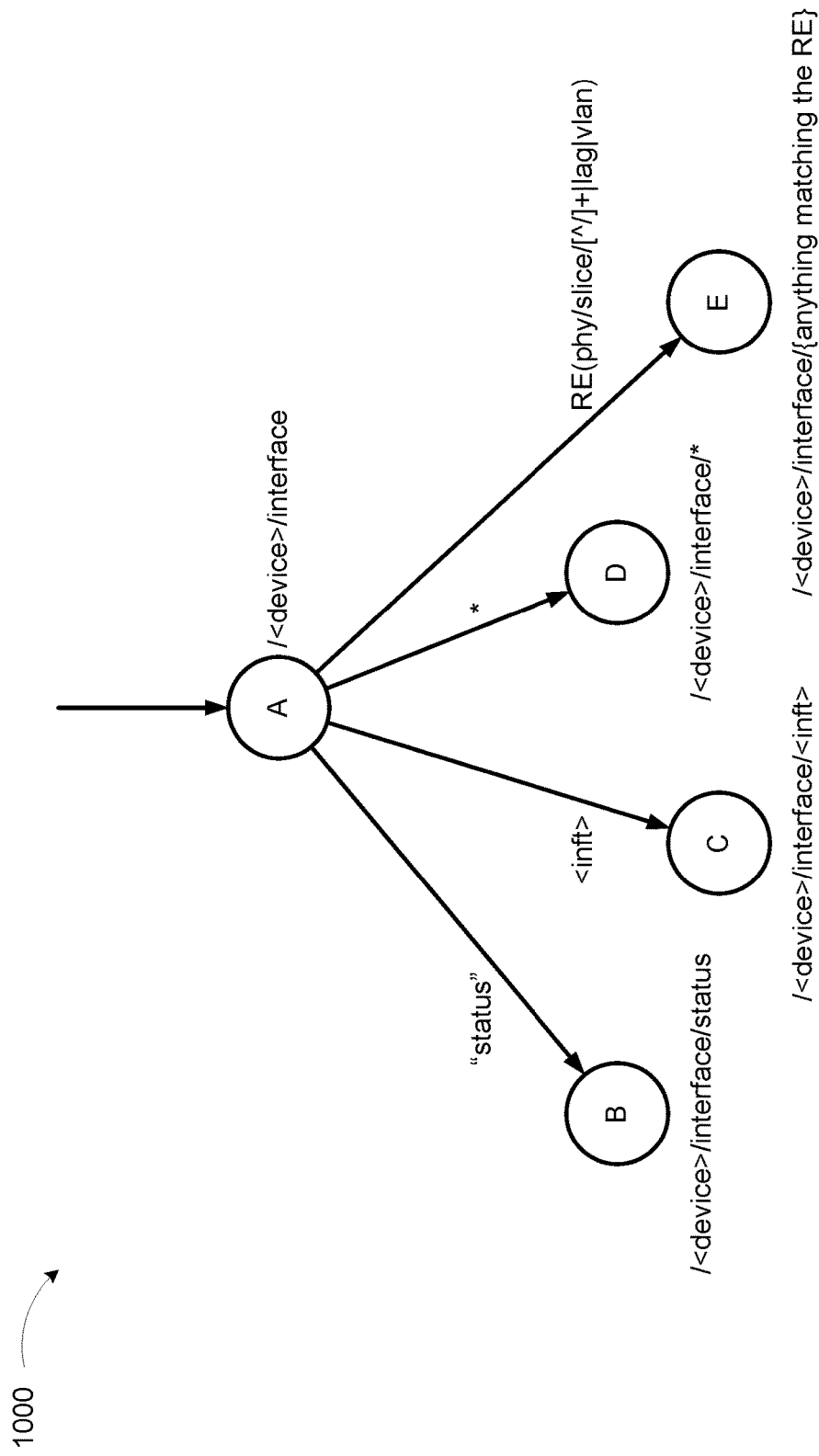
FIG. 10 illustrates different types of matches in an example translation tree, according to an illustrative implementation.

FIG. 10 illustrates different types of matches in an example translation tree 1000, according to an illustrative implementation. The translation tree 1000 includes a first-tier node A pointing to each of its second-tier daughter nodes B, C, D, and E.

The functionality of the translator 945 can be defined by its input and output as illustrated by the example translation tree 1000 and described in the following operation. The input to the translator 945 can be a vendor-specific path of a value, the value itself, and the type of the value. The output of the translator 945 can include a vendor-neutral path of the value and the translated value. The vendor-neutral path can be defined by a normalized data model as provided by the normalized data model 950, and the type information database 955. The type of the translated value can come from the same YANG models.

A path is a list of elements, either vendor-specific or vendor-neutral. Most often, a path is represented as a single string joined by elements with a pre-defined separator; for example, a slash "/". Since the separator can also appear inside an element, e.g. "/" inside an element "Ethernet3/10/1", an alternative approach that represents a path as a list/array/slice of individual elements can be more precise in delineating element boundaries. In the following examples, string representation for paths are used for simplicity, but the actual representation of a path (string representation or list representation) is not assumed. The solution presented below can address either the string or the list representation.

In a first example, the input string can be: "/device/interface/status/eth/phy/slice/Linecard3/intfStatus/Ethernet3/10/1/deviceName"

And the output string can be: "/device/device/interfaces/interface/Ethernet3/10/1/name"

As described above, "Ethernet3/10/1" may come as a single element if the path is given as a list representation, or it may be split into multiple elements if the path is given as a string representation. Either way, the solution presented below can correctly address it.

In the above example, the second "device" is device name and "Ethernet3/10/1" is an interface name. The two elements are dynamic parts of the paths and are common to both the vendor-specific path and the vendor-neutral path. There may be hundreds of network devices 930 and on each network device 930, there may also be hundreds or thousands of interfaces. It may not be desirable to enumerate the network devices and interfaces in the configuration library 940, or in any other internal data structures, however. So the translator 945 may commence by parameterizing the paths. For example, after replacing the second device "device" with <device> and "Ethernet3/10/1" with <intf>, the input can become: "/<device>/interface/status/eth/phy/slice/Linecard3/intfStatus/<intf>/deviceName"

And the output can become: "/device/<device>/interfaces/interface/<intf>/name"

The translator 945 can now can match vendor-specific path patterns as specified in the input. For a successful match, the translator 945 should be able to extract these named parameters and get a vendor-neutral path template as illustrated in the output. Then the translator 945 can expand the path template with the extracted named parameters to get the vendor-neutral path.

In some implementations, the above parameterized path pattern and templates method can employ a regular expression (regex) for each vendor-specific path pattern. The regular expression can have named groups to extract parameters. So, corresponding to the path patterns, there can exist a flat list of regular expressions. When a notification such as a network telemetry data update comes with a path, the translator 945 can match the path against the regular expressions sequentially until a match is found. The match can generate named parameters if any and also a vendor-neutral path template to expand.

This disclosure proposes a tree structure based approach to translation. For a translation tree, a path can be viewed as a list of elements. If a path is represented as a joined string, it can be converted into a list of elements by splitting at the separator. For example, interface names like "Ethernet3/10/1", can be split into multiple elements if they are not given as a single element. This approach provides ways to avoid complex and potentially fragile string-based processing.

In a translation tree, such as the translation tree 1000, each node can represent a path pattern. A leaf node represents a full path pattern for a scalar value. A link between a parent node and its child node represents a match of an element or multiple consecutive elements (both can be called as a span in a path pattern). There are several different types of matches, for example:

Literal Match: A single element matching a string literal. No parameter returned from this match.

Parameter Match: A single element of anything, and the element becomes a named parameter.

Anything Match: A single element of anything, but no parameter returned from this match.

Regex Match: A span of a single element or multiple consecutive elements matching a regular expression, which may have named parameters.

Function Match: A span of a single element or multiple consecutive elements matching a pattern defined by a function, which may return named parameters. Function match is an enhanced version of regex match. It does not restrict the matching to be a simple regular expression match. It can also do more complex processing to get the extracted parameters.

The translation tree 1000 in FIG. 10 illustrates the different types of matches. Suppose node A represents a path pattern "/<device>/interface". Also assume that a path matching already matched the first two elements of the path with the pattern represented by A.

The link between A and B is an example of a literal match with string literal "status". Pattern B represents a path according to "/<device>/interface"+"/"+"status". Thus, if the first remaining element in the path is "status", then the path matching can continue from A to B.

The link between A and C is an example of a parameter match with parameter of "intf". Therefore, no matter what the first remaining element in the path is (as long as it is non-empty), the first remaining element becomes the value of parameter "intf", and the path matching can continue from A to C.

The link between A and D is an example of an anything ("*") match. No matter what the first remaining element in the path is (as long as it is non-empty), the path matching can continue from A to D with no parameters extracted.

The link between A and E is an example of a regex match. The regex can match the first remaining element or the first several consecutive elements. The regex can also have named groups which become named parameters for a match. For example, if a match is found for the regex, then any named groups becomes named parameters, and the path matching can continue from A to E.

Note that the examples given in FIG. 10 are for illustration of different types of matches. The example translation tree 1000 can allow multiple matched nodes for a path pattern. For simplicity, however, a translation tree could be configured to have mutually exclusive matches pointing to its children. Having mutually exclusive nodes can make it easier to envision and maintain a large translation tree.

The translation tree 1000 is a condensed tree structure since each node represents a path pattern instead of a concrete path. The matches (links) between the nodes, except for literal matches, also describe a pattern.

Figure 11:
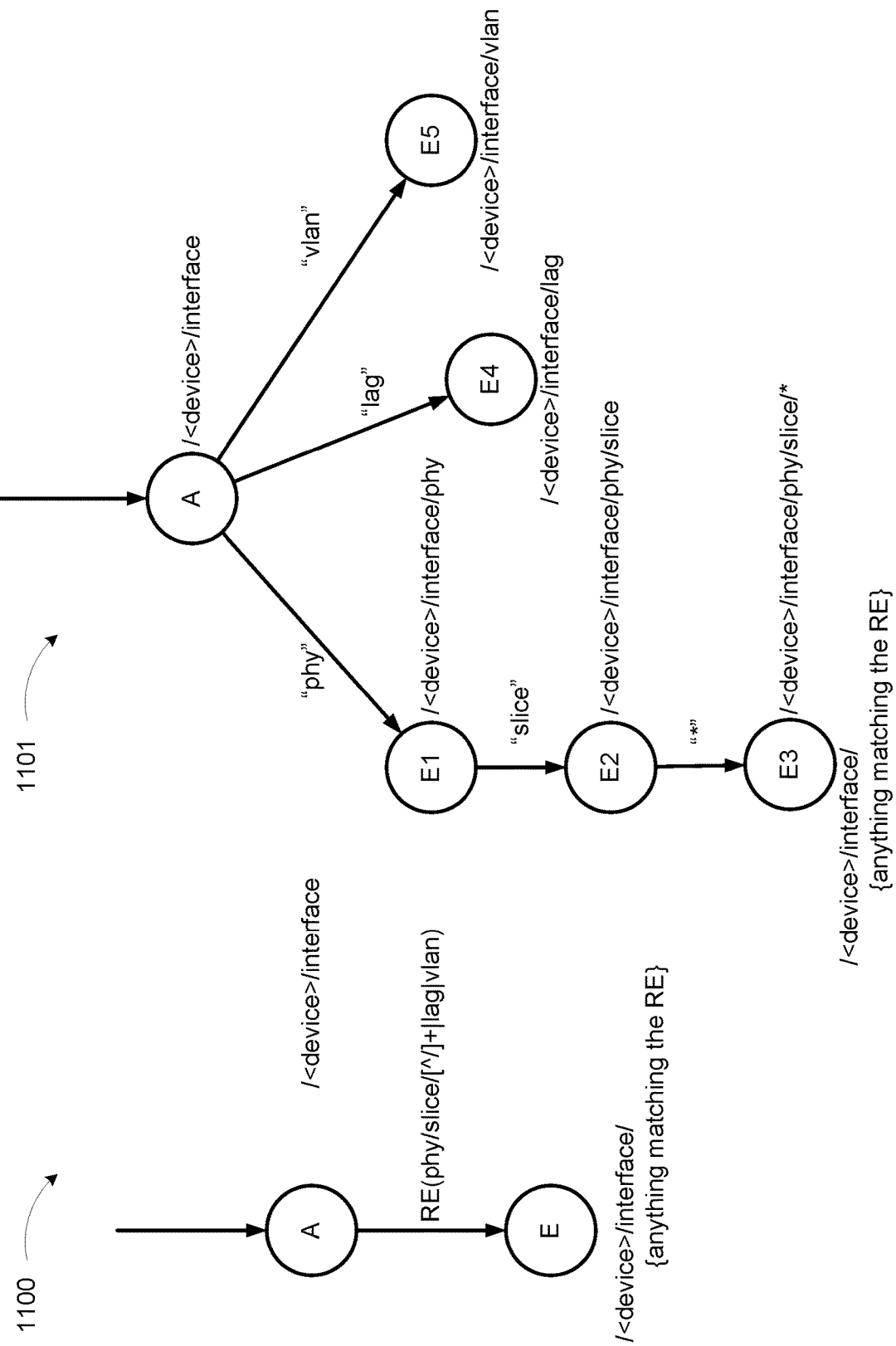
FIG. 11 illustrates an example of condensing a translation tree by regular expression match, according to an illustrative implementation.

FIG. 11 illustrates an example of condensing a translation tree 1100 by a regular expression match, according to an illustrative implementation. There are different types of interfaces; e.g. "phy", "lag", "vlan". They have the same set of attributes defined as interfaces. But they have different elements in their paths. Without using regex match, the translation tree will look like the right tree in FIG. 11. Nodes E3, E4, E5 will have to have to reproduce the same set of nodes as descendants, which could be hundreds of nodes depending on how many paths under the interface node. If a regex match is used, the translation tree will look like the left tree 1100 in FIG. 11.

In some implementations, the translation tree can be built based on human generated configuration files. The program building the translation tree may not have the intelligence to condense the tree like the example in FIG. 11 using regex matching. Therefore, the translator 945 may rely on some amount of human input to make the right choice and to use the right matches to describe different patterns. When used properly, it saves the work to enter the same set of attributes under different nodes.

Figure 12:
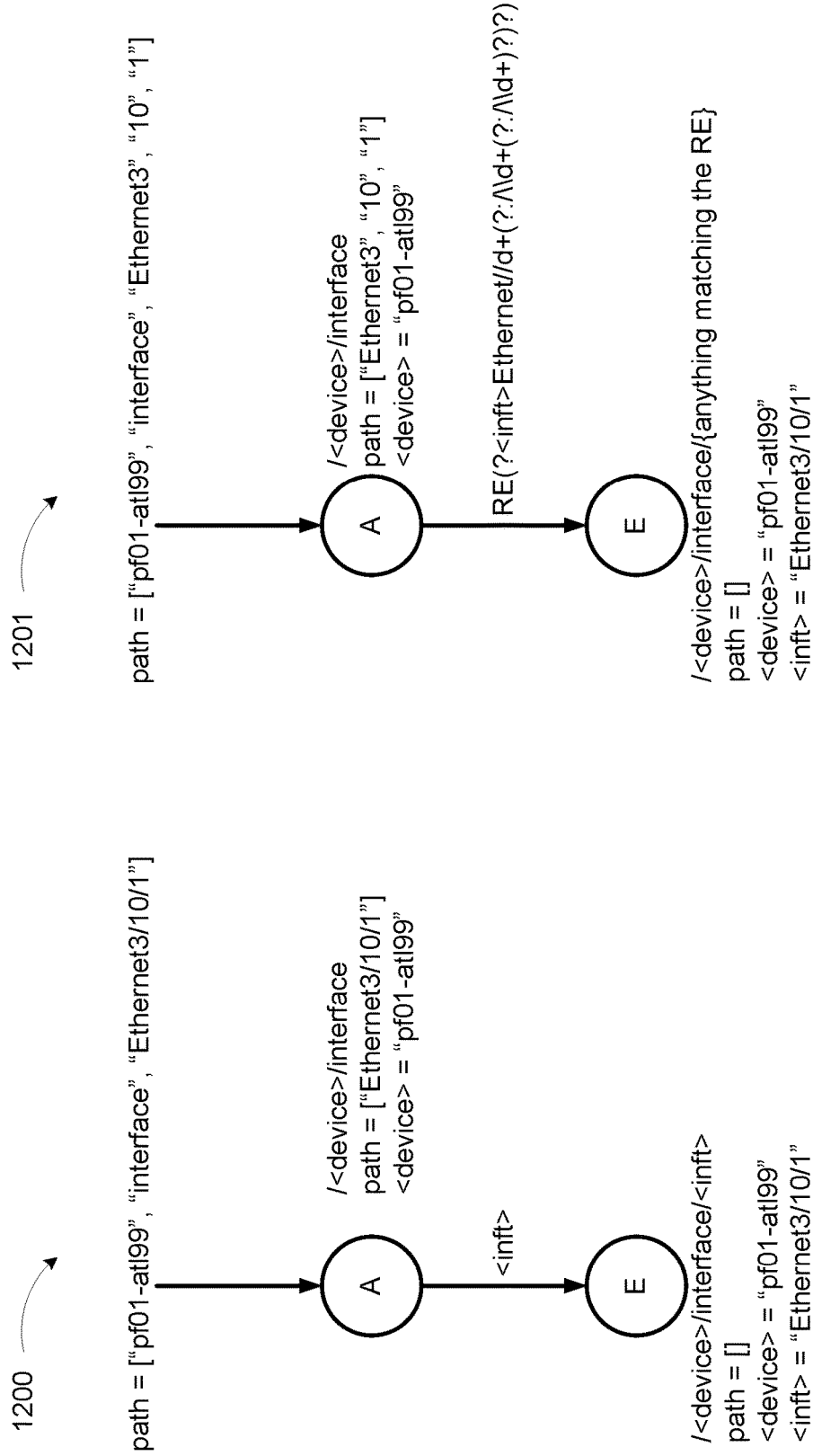
FIG. 12 illustrates using different matches based on whether a given path is correctly split, according to an illustrative implementation.

FIG. 12 illustrates using different matches 1200 and 1201 based on whether a given path is correctly split, according to an illustrative implementation. Some elements may contain the separators. For example, an interface name may be "Ethernet3", "Ethernet3/1", or "Ethernet3/10/1". If a path is given as a list of correctly split elements, then the interface name should be a single element even though it may have separators in it. One can use parameter match to get the single element as a parameter named as "intf" as shown in the match 1200.

If a path is given as a joined string or a list of incorrectly split elements, then the interface name could be in multiple elements ["Ethernet3", "10", "1"]. In this case, a regex match such as (?P<intf>Ethernet\\d+(?:/\\d+(?:/\\d+)?)?) can be used to extract the interface name from the path, as shown in the match 1201.

A leaf node, such as the leaf nodes E of matches 1200 and 1201 in FIG. 12, represents a full-length path pattern for a scalar value. It should have a vendor-neutral path template for the scalar value. The vendor-neutral path template can be expanded with the named parameters to get the vendor-neutral path for a particular path. The mapping from a vendor-specific path pattern to the vendor-neutral path template can come from the configuration library 940.

A leaf node should also have the type information corresponding to the vendor-neutral path. When creating the leaf node, the translation tree builder looks up the type information from a "database" compiled from the normalized data models 950. The vendor-specific data have a given data type or an inferred data type. An automatic data type conversion can be performed if no complex processing is needed. For example, convert a string to an integer.

If simple type conversion does not suffice, a mapper function can be called to perform data translation. Mapper functions are discussed in further detail below with reference to FIG. 13. The name of the function should be specified in configuration library 940 and cached in the leaf node when the translation tree is built.

Once a translation tree is built, the path matching process works as below for each path in the coming notifications:

1. split the path p into a list of elements if the path given is not already split.
2. initialize an empty map m for the named parameters.
3. node cur=root of the translation tree
4. if p is an empty list, then return node cur and map m as a successful match.
5. try to find a match from all matches at node cur.
6. if no match is found, return nil node nil and nil map to indicate no match found for p.
7. if a match is found, add named parameters to m if there are any in this match.
8. remove matched elements from path p.
9. cur=child node pointed by the match. go to step 4.

The translation tree approach described above has a few benefits compared with the "list of regular expressions" approach. No long and complex regular expressions matching a full path. The regular expressions are mostly used for matching a single element or a span of consecutive elements that are logically one element.

In addition, the amortized time complexity of the path matching process is roughly the depth of the translation tree because at each node the number of matches is small. And at each node, it only looks at a fraction of the path. For literal match, parameter match and anything match, the processing is very simple since only one element is involved. The depth of the translation tree is expected to be around 10. For the "list of regular expressions" approach, the time complexity of path matching process is mainly bound by the number of full path patterns, which are expected to be in the range of hundreds. And for each path pattern, it has to run a regular expression match for the full path.

Finally, it is easier to implement more powerful match like the function match using translation tree.

Figure 13:
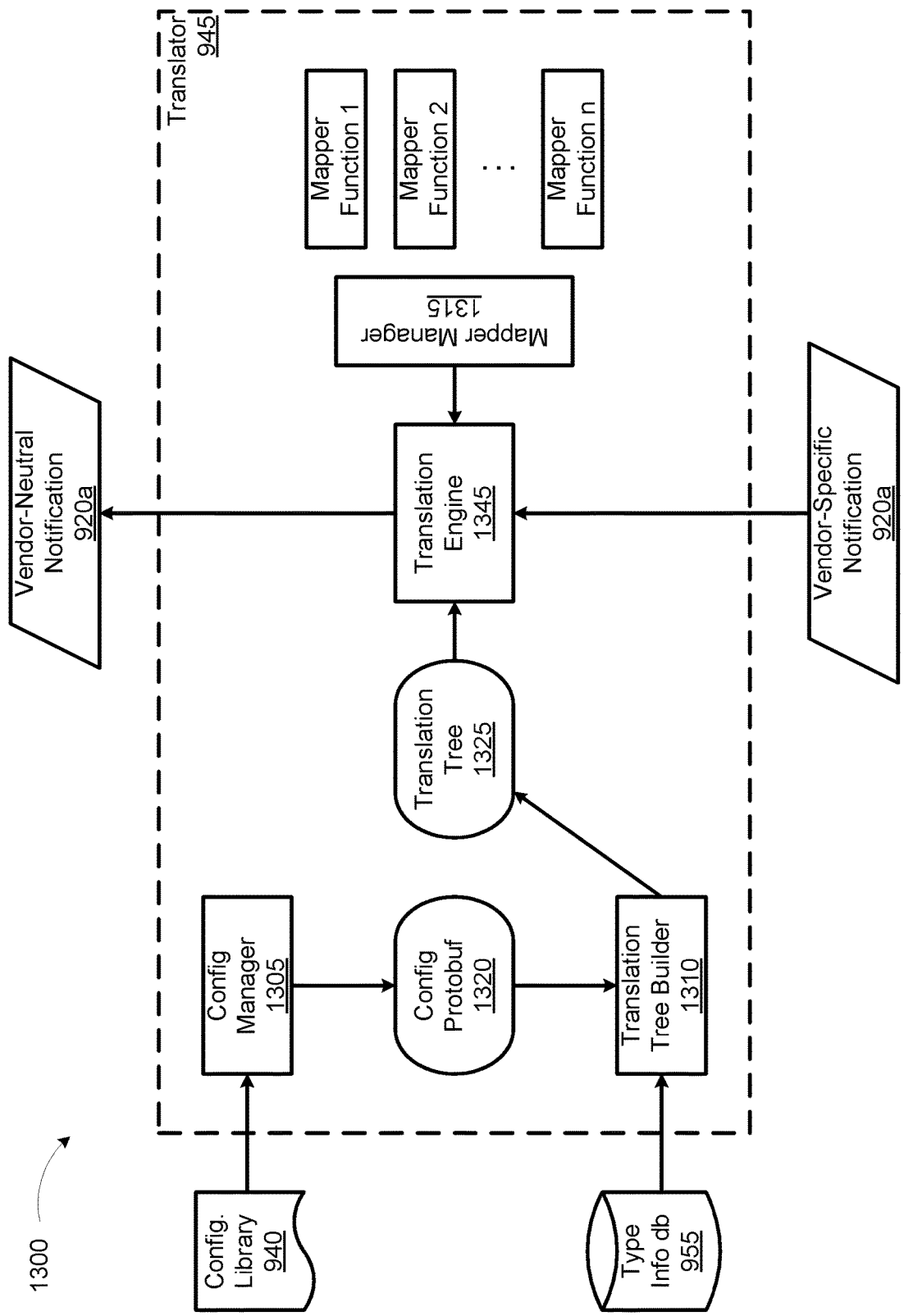
FIG. 13 illustrates an example translator internal architecture, according to an illustrative implementation.

FIG. 13 illustrates an example translator 945 internal architecture, according to an illustrative implementation. The translator 945 is part of a system 1300 that includes inputs from the configuration library 940 and the type information database 955. The translator 945 can output vendor-neutral notifications 920a and 920b (collectively "vendor-neutral notifications 920"). The translator 945 includes a configuration manager 1305, a translation tree builder 1310, a mapper manager 1315, a translation engine 1345, a configuration protocol buffer 1320, and a translation tree 1325.

The configuration manager 1305 monitors the changes in configuration files in the configuration library 940. The configuration manager 1305 reloads a configuration file when it detects a change in that configuration file. In some implementations, the configuration manager 1305 can employ a lock manager to control access to the configuration files in the configuration library 940. In some implementations, the configuration manager 1305 can use a distributed lock service. The configuration manager's 1305 use of files stored in the distributed lock service can facilitate easy reloading of configuration changes when the configuration manager 1305 detects a change.

The translation tree builder 1310 can build translation trees. The translation tree structure is designed to facilitate translation of a vendor-specific path into a vendor-neutral path. On the leaf node, it also has the type information of the vendor-neutral scalar data. The translation tree builder 1310 can build a translation tree from the configuration protocol buffer 1320. The translation tree builder 1310 can also cache the type information into the leaf node by looking up the type information when building the tree data structure. Then, following the initial tree building, the translator 945 should not need to lookup type information in the database again.

The mapper manager 1315 can implement additional translation when necessary. When translating vendor-specific data to vendor-neutral data, there are cases where more complex processing than a simple type conversion may be needed. In these situations, the mapper 1315 can perform the translation. Mapper functions, such as the mapper functions 1-n, can be registered to Mapper Manager using unique names. Then in the configuration files, mapper function names can be specified to indicate that the translator 945 can call the corresponding mapper functions to perform the translation. The mapper functions can be applied to the data value as well as the named parameter extracted from the path by the translation tree 1325.

The translation engine 1345 can translate the vendor-specific notifications into vendor-neutral notifications using the translation tree 1325 and, in some cases, the mapper functions. A notification may include both deletes and updates. For deletes, the translation engine 1345 need only to translate the vendor-specific paths into vendor-neutral paths. For updates, the translation engine 1345 may need to perform type conversion of the values, if the vendor-specific format does not match the vendor-neutral format. If a mapper function name is specified in the configuration library 940, the corresponding leaf node in the translation tree 1325 will also have the mapper function name. The translation engine 1345 will find the function address using the function name through mapper manager 1315 and call the function to translate data.

In an example operation, the translator 945 can retrieve from the configuration library 940 information regarding which vendor-specific path translates into which vendor-neutral path, for all interested values. Because many values share the same common path prefix, the configuration file can be organized in two levels: PathMapEntry and ValueMapEntry. PathMapEntry is for all values under a common path prefix. ValueMapEntry is for an individual value. Because a ValueMapEntry may be inside a PathMapEntry, the key and std_name in ValueMapEntry can be relative to the vendor_path and std_path in the PathMapEntry. For example, each ValueMapEntry can tell the translator 945 that <vendor_path>/<key> maps to <std_path>/<std_name>. For example:

```
// ValueMapEntry contains translation information from a vendor-specific
// value to a vendor-neutral value
message ValueMapEntry {
    // Required. Standardized vendor-neutral name for the value
    string std_name = 1;
    // Optional. The name of a function that transforms the value before type
    // conversion and writing to the vendor-neutral tree.
    string mapper = 2;
}
// PathMapEntry contains translation information from a vendor-specific
// path (and values under this path) to a vendor-neutral path
message PathMapEntry {
    // Required. A string that specifies the pattern of the vendor-specific paths
    // matching this entry.
    string vendor_path = 1;
    // Required. Standardized vendor-neutral path template.
    string std_path = 2;
    // Required. Mapping for values (fields) under this path.
    map<string, ValueMapEntry> val_map = 3;
}
// PathMap contains translation information for all paths (and values
// under the paths)
message PathMap {
    repeated PathMapEntry entries = 1;
}
```

In PathMapEntry, both vendor_path and key to val_map are path patterns. The concatenated path pattern <vendor_path>/<key> corresponds to scalar values. Because the path pattern specified in PathMap is used to build the translation tree 1325, there should be enough information for the builder to know which span in a path pattern should be converted to what match in a translation tree 1325. Instead of specifying the path pattern in a list of spans, we choose to specify it in a string, which should be more friendly for a human to read and edit the configuration file.

For example, here is how the string is parsed into spans which in turn are converted to matches in a translation tree:

"/" is still used to separate the spans. For spans corresponding to literal match, parameter match and anything match, the rule is simple.

"<device>" is a parameter match because it has "<" and ">" as the first and last characters.

"*" is an anything match,

Any span that is not a span for a parameter match, an anything match, a regex match, or a function match will be a span for a literal match.

In some implementations, the collection and translation system 110 may need to determine whether a span is a literal match or a regular expression match. The translation system 110 can use a heuristic to determine, with a certain probability, whether a string is a regular expression. It would be beneficial, however, if the translation system 110 could use a configuration file to determine precisely whether a given span is a regular expression. Similarly, it would be beneficial for the translation system 110 to know if the regular expression can match multiple elements in a path or not. (That is, if the translation system 110 can only match one element of the path, there may be no need to join the path for regular expression matching.) So a configuration file could use "{{regex}}" to enclose a regular expression span. If the regex raw string has "/" in it, then the translation system 110 can considered it a potential-multiple-element regular expression span. Otherwise, the translation system 110 can consider it a single-element regular expression span. For example:

"/{{Linecard(?P<lcnum>\\d+)}}/" is a single-element regex span.

"/{{(?P<intf>Ethernet\\d+(?:A\d+(?:A\d+)?)?)}}/" is a potential-multiple-element regex span.

If we ever need a function match, the span can be represented as:

"<para1, para2, . . . >the-name-of-the-function( )"

When parsing a span, if the first character is "<" and the last two characters are "( )", then it is a function span.

Both std_path in PathMapEntry and std_name in ValueMapEntry can be path templates with parameters to expand. A path template is represented as a single string, with elements separated by "/". The elements can either be a literal or a parameter. A parameter is surrounded by "<" and ">". For example:

"/device/<device>/interfaces/interface/<intf>"

Below is an example configuration from a configuration file in the configuration library 940:

```
entries: {
    vendor_path:
"/<device>/interface/counter/eth///(slice/phy/['/.]+|lag|vlan)///intfCounterDir///(?P<intf>Ethernet
\\d+(?:\\d+(?:\\d+)?)?|Port-Channel\\d+)///intfCounter/current"
    std_path: "/device/<device>/interfaces/interface/<intf>/counters"
    val_map: {
        key: "statistics/inBroadcastPkts"
        value: { std_name: "in_broadcast_pkts" }
    }
    val_map: {
        key: "statistics/inDiscards"
        value: { std_name: "in_discards" }
    }
    val_map: {
        key: "statistics/inErrors"
        value: { std_name: "in_errors" }
    }
}
```

Meaning:

"/<device>/interface/counter/eth///(slice/phy/['/.]+|lag|vlan)///intfCounterDir///(?P<intf>Ethernet
\\d+(?:\\d+(?:\\d+)?)?|Port-Channel\\d+)///intfCounter/current/statistics/inBroadcastPkts" maps to "device/<device>/interfaces/interface/<intf>/counters/in_broadcast_pkts"

"/<device>/interface/counter/eth///(slice/phy/['/.]+|lag|vlan)///intfCounterDir///(?P<intf>Ethernet
\\d+(?:\\d+(?:\\d+)?)?|Port-Channel\\d+)///intfCounter/current/statistics/inDiscards" maps to
"device/<device>/interfaces/interface/<intf>/counters/in_discards"

"/<device>/interface/counter/eth///(slice/phy/['/.]+|lag|vlan)///intfCounterDir///(?P<intf>Ethernet
\\d+(?:\\d+(?:\\d+)?)?|Port-Channel\\d+)///intfCounter/current/statistics/inErrors" maps to
"/device/<device>/interfaces/interface/<intf>/counters/in_errors"

Figure 14:
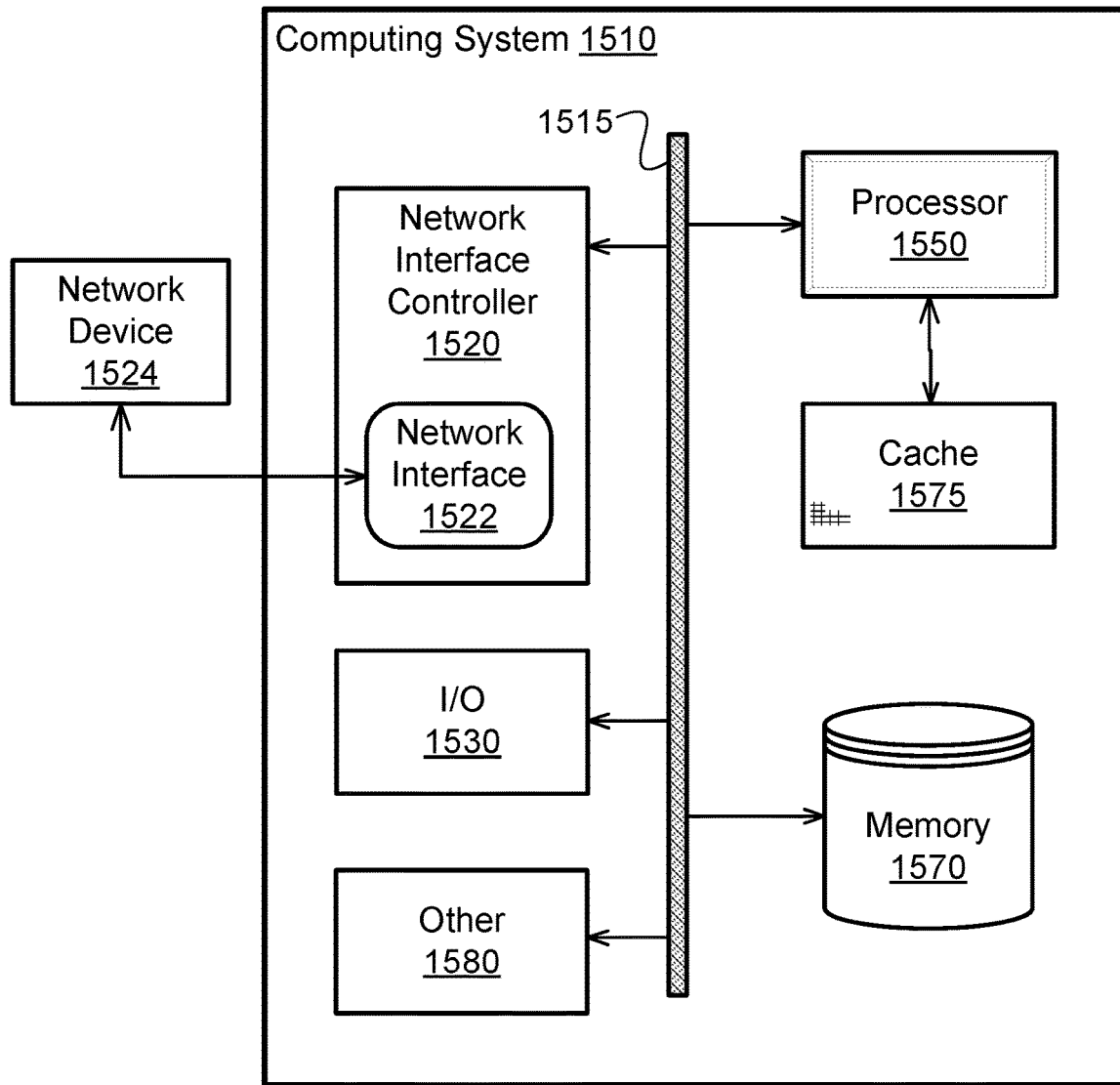
FIG. 14 is a block diagram illustrating a general architecture for a computer system that may be employed to implement elements of the systems and methods described and illustrated herein, according to an illustrative implementation.

FIG. 14 is a block diagram illustrating a general architecture for a computer system 1500 that may be employed to implement elements of the systems and methods described and illustrated herein, according to an illustrative implementation. The computing system 1500 can be used to implement one or more of the devices described above, including the caching and distribution system 110, the network devices 120, the client devices 130, the collection and translation system 910, or the network devices 920. The computing system 1500 may be utilized in implementing the caching and distribution method 800 shown in FIG. 8.

In broad overview, the computing system 1510 includes at least one processor 1550 for performing actions in accordance with instructions, and one or more memory devices 1570 or 1575 for storing instructions and data. The illustrated example computing system 1510 includes one or more processors 1550 in communication, via a bus 1515, with at least one network interface controller 1520 with one or more network interface ports 1522 connecting to one or more network devices 1524, memory 1570, and any other devices 1580; e.g., an I/O interface. Generally, a processor 1550 will execute instructions received from memory. The processor 1550 illustrated incorporates, or is directly connected to, cache memory 1575.

In more detail, the processor 1550 may be any logic circuitry that processes instructions, e.g., instructions fetched from the memory 1570 or cache 1575. In many embodiments, the processor 1550 is a microprocessor unit or special purpose processor. The computing device 1500 may be based on any processor, or set of processors, capable of operating as described herein. In some implementations, the processor 1550 can be capable of executing the caching and distribution method 800 shown in FIG. 8. The processor 1550 may be a single core or multi-core processor. The processor 1550 may be multiple processors. In some implementations, the processor 1550 can be configured to run multi-threaded operations. In some implementations, the processor 1550 may host one or more virtual machines or containers, along with a hypervisor or container manager for managing the operation of the virtual machines or containers. In such implementations, the caching and distribution method 800 shown in FIG. 8 can be implemented within the virtualized or containerized environments provided on the processor 1550.

The memory 1570 may be any device suitable for storing computer readable data. The memory 1570 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 1500 may have any number of memory devices 1570. In some implementations, the memory 1570 can include instructions corresponding to the caching and distribution method 800 shown in FIG. 8. In some implementations, the memory 1570 supports virtualized or containerized memory accessible by virtual machine or container execution environments provided by the computing system 1510.

The cache memory 1575 is generally a form of computer memory placed in close proximity to the processor 1550 for fast read times. In some implementations, the cache memory 1575 is part of, or on the same chip as, the processor 1550. In some implementations, there are multiple levels of cache 1575, e.g., L2 and L3 cache layers.

The network interface controller 1520 manages data exchanges via the network interfaces 1522 (also referred to as network interface ports). The network interface controller 1520 handles the physical and data link layers of the OSI model for network communication. In some implementations, some of the network interface controller's tasks are handled by the processor 1550. In some implementations, the network interface controller 1520 is part of the processor 1550. In some implementations, a computing system 1510 has multiple network interface controllers 1520. The network interfaces 1522 are connection points for physical network links. In some implementations, the network interface controller 1520 supports wireless network connections and an interface port 1522 is a wireless receiver/transmitter. Generally, a computing device 1510 exchanges data with other network devices 1524 via physical or wireless links to a network interfaces 1522. In some implementations, the network interface controller 1520 implements a network protocol such as Ethernet.

The other network devices 1524 are connected to the computing device 1510 via a network interface port 1522. The other network devices 1524 may be peer computing devices, network devices, or any other computing device with network functionality. For example, a first network device 1524 may be a network device such as a hub, a bridge, a switch, or a router, connecting the computing device 1510 to a data network such as the Internet.

The other devices 1580 may include an I/O interface, external serial device ports, and any additional co-processors. For example, a computing system 1510 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1500 includes an additional device 1580 such as a coprocessor, e.g., a math co-processor can assist the processor 1550 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A network telemetry caching and distribution system comprising one or more processors connected to a physical memory and configured to:
   receive, from a network device, a set of network telemetry data;
   store, in a first memory space of the physical memory, the set of network telemetry data as a plurality of data nodes;
   maintain, in a second memory space of the physical memory, a client queue having a node pointer queue and a node pointer map, wherein the node pointer map includes a plurality of node-pointer, node-count pairs, each node pointer indicating a path to a data node corresponding to the node pointer, and the node count indicating a number of updates to the data node since a previous transmission of the contents of the data node to a client device;
   receive, from the network device, a data node update;
   if the data node update corresponds to a data node having a corresponding node pointer not already present in the node pointer map:
      add the corresponding node pointer to the node pointer map with a count of zero and add the corresponding node pointer to the node pointer queue;
   if the data node update corresponds to a data node having a corresponding node pointer already present in the node pointer map:
      increment the node count for the corresponding node pointer in the node pointer map and not add the corresponding node pointer to the node pointer queue; and
   transmit, to the client device, a set of node-value, node-count pairs including, for each node pointer in the node pointer queue, a data value in the data node corresponding to the node pointer, and the node count in the node pointer map corresponding to the node pointer, wherein the node count informs of the client device that it has missed one or more previous data values since the previous transmission.

2. The system of claim 1, wherein the node pointer queue is a first-in-first-out (FIFO) queue that receives node pointers at its input, and provides the node pointers at its output in the order in which they were received.

3. The system of claim 1, wherein the system is configured to transmit the set of node-value, node-count pairs in response to a query received from the client device.

4. The system of claim 3, wherein the system is configured to transmit, to the client device in response to receipt of a request received from the client device subsequent to the query, a second set of node-value, node-count pairs reflecting updates received to data nodes occurring since the transmission of the set of the node-value, node-count pairs.

5. The system of claim 3, wherein the system is configured to continually transmit, following transmission of the first set of node-value, node-count pairs, a second set of node-value, node-count pairs reflecting updates received to data nodes as they occur.

6. The system of claim 3, wherein the system is configured to respond to query that includes a subpath representing an index node by returning pointers to all data nodes that the index node points to either directly or indirectly via intermediary index nodes.

7. The system of claim 1, wherein the system is configured to store the received network telemetry data in a tree data structure having a top-level node pointing, via a plurality of index nodes to, a plurality of data nodes, wherein each data node includes a path, a data value, and a timestamp.

8. The system of claim 7, wherein the network device is a first network device, the set of network telemetry data is a first set of network telemetry data, and the tree data structure is a first tree data structure, and the system is configured to:
receive a second set of network telemetry data from a second network device;
store the second set of network telemetry data in a second tree data structure; and
maintain a device-index map that stores, for each network device, a network device name and an indexed cache pointer pointing to a tree data structure corresponding to the network device name.

9. The system of claim 8, comprising:
a first computing device including the one or more processors and the physical memory;
a second computing device including a second one or more processors and a second physical memory, wherein the system is configured to store the second tree data structure in a second memory space of the second physical memory.

10. The system of claim 7, wherein the system is configured to, during a read operation of a target data node:
impose a write lock on the target data node, the write lock preventing any other process from reading from or modifying the target data node during the read operation; and
impose a readlock on the top level node and any intermediary index nodes between the top-level node and the target data node, the read lock preventing any other process from modifying read locked nodes during the read operation.

11. The system of claim 7, wherein the system is configured to, during an update operation on a target data node:
impose a write lock on the target data node, the write lock preventing any other process from reading from or modifying the target data node during the update operation; and
impose a read lock on the top-level node and any intermediary index nodes between the top-level node and the target data node, the read lock preventing any other process from modifying read locked nodes during the update operation.

12. The system of claim 7, wherein the system is configured to, during an add operation or a delete operation on a target node, the target node being a data node or an index node:
impose a write lock on the target node and a parent node pointing to the target node, the write lock preventing any other process from reading from or modifying write locked nodes during the add or delete operation; and
impose a read lock on any index nodes preceding the parent node, the read lock preventing any other process from modifying read locked nodes during the add or delete operation.

13. A method of network telemetry caching and distribution comprising:
receiving, from a network device, a set of network telemetry data;
storing, in a first memory space of the physical memory, the received network telemetry data as a plurality of data nodes;
maintaining, in a second memory space of the physical memory, a client queue having a node pointer queue and a node pointer map, wherein the node pointer map includes a plurality of node-pointer, node-count pairs, each node pointer indicating a path to a data node corresponding to the node pointer, and the node count indicating a number of updates to the data node since a previous transmission of the contents of the data node to a client device;
receive, from the network device, a data node update;
if the data node update corresponds to a data node having a corresponding node pointer not already present in the node pointer map:
adding the corresponding node pointer to the node pointer map with a count of zero and adding the corresponding node pointer to the node pointer queue;
if the data node update corresponds to a data node having a corresponding node pointer already present in the node pointer map:
incrementing the node count for the corresponding node pointer in the node pointer map and not adding the corresponding node pointer to the node pointer queue; and
transmitting, to the client device, a set of node-value, node-count pairs including, for each node pointer in the node pointer queue, a data value in the data node corresponding to the node pointer, and the node count in the node pointer map corresponding to the node pointer, wherein the node count informs of the client device that it has missed one or more previous data values since the previous transmission.

14. The method of claim 13, wherein the node pointer queue is a first-in-first-out (FIFO) queue that receives node pointers at its input, and provides the node pointers at its output in the order in which they were received.

15. The method of claim 13, comprising:
receiving a query from the client device, wherein transmitting the set of node-value, node-count pairs is performed responsive to receiving the query.

16. The method of claim 15, comprising:
receiving a request from the client device subsequent to the query; and
transmitting, to the client device in response to the request, a second set of node-value, node-count pairs reflecting updates received to data nodes occurring since the transmission of the set of the node-value, node-count pairs.

17. The method of claim 15, comprising:
continually transmitting, following transmission of the first set of node-value, node-count pairs, a second set of node-value, node-count pairs reflecting updates received to data nodes as they occur.

18. The method of claim 15, wherein the query includes a subpath representing an index node, the method comprising:
returning pointers to all data nodes that the index node points to either directly or indirectly via intermediary index nodes.

19. The method of claim 13, comprising:
storing the received network telemetry data in a tree data structure having a top-level node pointing, via a plurality of index nodes to, a plurality of data nodes, wherein each data node includes a path, a data value, and a timestamp.

20. The method of claim 19, wherein the network device is a first network device, the set of network telemetry data is a first set of network telemetry data, and the tree data structure is a first tree data structure, the method comprising:
receiving a second set of network telemetry data from a second network device;
storing the second set of network telemetry data in a second tree data structure; and
maintaining a device-index map that stores, for each network device, a network device name and an indexed cache pointer pointing to a tree data structure corresponding to the network device name.

21. The method of claim 20, comprising:
storing the second tree data structure in a second memory space of a second physical memory of a second computing device.

22. The method of claim 19, comprising, during a read operation of a target data node:
imposing a write lock on the target data node, the write lock preventing any other process from reading from or modifying the target data node during the read operation; and
imposing a read lock on the top-level node and any intermediary index nodes between the top-level node and the target data node, the read lock preventing any other process from modifying read locked nodes during the read operation.

23. The method of claim 19, comprising, during an update operation on a target data node:
imposing a write lock on the target data node, the write lock preventing any other process from reading from or modifying the target data node during the update operation; and
imposing a read lock on the top-level node and any intermediary index nodes between the top-level node and the target data node, the read lock preventing any other process from modifying read locked nodes during the update operation.

24. The method of claim 19, comprising, during an add operation or a delete operation on a target node, the target node being a data node or an index node:
imposing a write lock on the target node and a parent node pointing to the target node, the write lock preventing any other process from reading from or modifying write locked nodes during the add or delete operation; and
imposing a read lock on any index nodes preceding the parent node, the read lock preventing any other process from modifying read locked nodes during the add or delete operation.

* * * * *